United States Patent
Putman et al.

(10) Patent No.: US 8,933,648 B1
(45) Date of Patent: Jan. 13, 2015

(54) SYSTEMS AND METHODS FOR SELECTING A COMPATIBILITY MODE OF OPERATION FOR A LAMP ASSEMBLY

(71) Applicant: Cirrus Logic, Inc., Austin, TX (US)

(72) Inventors: Richard Dean Putman, Dripping Springs, TX (US); Yanhui Xie, Austin, TX (US); Michael Kost, Austin, TX (US); Jean Charles Pina, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/037,001

(22) Filed: Sep. 25, 2013

Related U.S. Application Data

(63) Continuation-in-part of application No. 13/799,329, filed on Mar. 13, 2013.

(60) Provisional application No. 61/831,300, filed on Jun. 5, 2013, provisional application No. 61/673,111, filed on Jul. 18, 2012, provisional application No. 61/667,685, filed on Jul. 3, 2012.

(51) Int. Cl.
   *H05B 37/02* (2006.01)

(52) U.S. Cl.
   CPC ..................................... *H05B 37/02* (2013.01)
   USPC .......................................... 315/308; 315/291

(58) Field of Classification Search
   USPC .............. 315/209 R, 276, 291, 307, 308, 312
   See application file for complete search history.

(56) References Cited

U.S. PATENT DOCUMENTS 8,212,491 B2   7/2012   Kost et al.
8,716,957 B2 *  5/2014   Melanson et al. ............ 315/360
(Continued)

FOREIGN PATENT DOCUMENTS

EP    2590477 A1   5/2013
WO   2011063205 A1  5/2011
(Continued)

OTHER PUBLICATIONS

International Search Report and Written Opinion, International Patent Application No. PCT/US2013/047777, mailed Jun. 26, 2014, 21 pages.

(Continued)

*Primary Examiner* — Jimmy Vu
(74) *Attorney, Agent, or Firm* — Jackson Walker L.L.P.

(57) ABSTRACT

According to systems and methods of this disclosure, a controller may be configured to: operate in a first compatibility mode of operation, determine from an input signal of the lamp assembly during operation in the first compatibility mode whether the first compatibility mode of operation provides compatibility between the lamp assembly and a power infrastructure to which it is coupled, select the first compatibility mode of operation from a plurality of modes of operation as a compatibility mode responsive to determining that the first compatibility mode of operation provides compatibility between the lamp assembly and a power infrastructure to which it is coupled, and select a second compatibility mode of operation from the plurality of modes of operation as the compatibility mode responsive to determining that the first compatibility mode of operation does not provide compatibility between the lamp assembly and the power infrastructure to which it is coupled.

20 Claims, 17 Drawing Sheets

(56) References Cited

U.S. PATENT DOCUMENTS

| | | |
|---|---|---|
| 2011/0012530 A1 | 1/2011 | Zheng et al. |
| 2011/0115400 A1 | 5/2011 | Harrison et al. |
| 2011/0121751 A1 | 5/2011 | Harrison et al. |
| 2011/0199017 A1 | 8/2011 | Dilger |
| 2011/0210674 A1 | 9/2011 | Melanson |
| 2012/0025729 A1 | 2/2012 | Melanson et al. |
| 2012/0043913 A1 | 2/2012 | Melanson |
| 2012/0049752 A1 | 3/2012 | King et al. |
| 2012/0112648 A1 | 5/2012 | Hariharan |
| 2012/0119669 A1 | 5/2012 | Melanson et al. |
| 2012/0139431 A1 | 6/2012 | Thompson |
| 2012/0286684 A1 | 11/2012 | Melanson et al. |
| 2012/0286826 A1 | 11/2012 | King et al. |
| 2013/0113458 A1 | 5/2013 | Riesebosch |

FOREIGN PATENT DOCUMENTS

| | | |
|---|---|---|
| WO | 2011111005 A1 | 9/2011 |
| WO | 2013090904 A1 | 6/2013 |

OTHER PUBLICATIONS

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

\* cited by examiner

SYSTEMS AND METHODS FOR SELECTING A COMPATIBILITY MODE OF OPERATION FOR A LAMP ASSEMBLY

RELATED APPLICATIONS

The present disclosure claims priority to U.S. Provisional Patent Application Ser. No. 61/831,300, filed Jun. 5, 2013, which is incorporated by reference herein in its entirety.

The present disclosure also claims priority as a continuation-in-part to U.S. patent application Ser. No. 13/799,329, filed Mar. 13, 2013, which claims priority to U.S. Provisional Patent Application Ser. No. 61/673,111, filed Jul. 18, 2012 and U.S. Provisional Patent Application Ser. No. 61/667,685, filed Jul. 3, 2012, each of which are incorporated by reference herein in their entirety.

FIELD OF DISCLOSURE

The present disclosure relates in general to the field of electronics, and more specifically to systems and methods for ensuring compatibility between one or more low-power lamps and the power infrastructure to which they are coupled.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load.

A particular type of a triac-based, phase-cutting dimmer is known as a leading-edge dimmer A leading-edge dimmer phase cuts from the beginning of an AC cycle, such that during the phase-cut angle, the dimmer is "off" and supplies no output voltage to its load, and then turns "on" after the phase-cut angle and passes phase cut input signal to its load. To ensure proper operation, the load must provide to the leading-edge dimmer a load current sufficient to maintain an inrush current above a current necessary for opening the triac. Due to the sudden increase in voltage provided by the dimmer and the presence of capacitors in the dimmer, the current that must be provided is typically substantially higher than the steady state current necessary for triac conduction. Additionally, in steady state operation, the load must provide to the dimmer a load current to remain above another threshold known as a "hold current" needed to prevent premature disconnection of the triac.

FIG. 1 depicts a lighting system 100 that includes a triac-based leading-edge dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$ is, for example, a nominally 60 Hz/110 V line voltage in the United States of America or a nominally 50 Hz/220 V line voltage in Europe. Triac 106 acts as a voltage-driven switch, and a gate terminal 108 of triac 106 controls current flow between the first terminal 110 and the second terminal 112. A gate voltage $V_G$ on the gate terminal 108 above a firing threshold voltage value $V_F$ will cause triac 106 to turn ON, in turn causing a short of capacitor 121 and allowing current to flow through triac 106 and dimmer 102 to generate an output current $i_{DIM}$.

Assuming a resistive load for lamp 142, the dimmer output voltage $V_{\Phi\_DIM}$ is zero volts from the beginning of each of half cycles 202 and 204 at respective times $t_0$ and $t_2$ until the gate voltage $V_G$ reaches the firing threshold voltage value $V_F$. Dimmer output voltage $V_{\Phi\_DIM}$ represents the output voltage of dimmer 102. During timer period $t_{OFF}$, the dimmer 102 chops or cuts the supply voltage $V_{SUPPLY}$ so that the dimmer output voltage $V_{\Phi\_DIM}$ remains at zero volts during time period $t_{OFF}$. At time $t_1$, the gate voltage $V_G$ reaches the firing threshold value $V_F$, and triac 106 begins conducting. Once triac 106 turns ON, the dimmer voltage $V_{\Phi\_DIM}$ tracks the supply voltage $V_{SUPPLY}$ during time period $t_{ON}$.

Once triac 106 turns ON, the current $i_{DIM}$ drawn from triac 106 must exceed an attach current $i_{ATT}$ in order to sustain the inrush current through triac 106 above a threshold current necessary for opening triac 106. In addition, once triac 106 turns ON, triac 106 continues to conduct current $i_{DIM}$ regardless of the value of the gate voltage $V_G$ as long as the current $i_{DIM}$ remains above a holding current value $i_{HC}$. The attach current value $i_{ATT}$ and the holding current value $i_{HC}$ is a function of the physical characteristics of the triac 106. Once the current $i_{DIM}$ drops below the holding current value $i_{HC}$, i.e. $i_{DIM} < i_{HC}$, triac 106 turns OFF (i.e., stops conducting), until the gate voltage $V_G$ again reaches the firing threshold value $V_F$. In many traditional applications, the holding current value $i_{HC}$ is generally low enough so that, ideally, the current $i_{DIM}$ drops below the holding current value $i_{HC}$ when the supply voltage $V_{SUPPLY}$ is approximately zero volts near the end of the half cycle 202 at time $t_2$.

The variable resistor 114 in series with the parallel connected resistor 116 and capacitor 118 form a timing circuit 115 to control the time $t_1$ at which the gate voltage $V_G$ reaches the firing threshold value $V_F$. Increasing the resistance of variable resistor 114 increases the time $t_{OFF}$, and decreasing the resistance of variable resistor 114 decreases the time $t_{OFF}$. The resistance value of the variable resistor 114 effectively sets a dimming value for lamp 142. Diac 119 provides current flow into the gate terminal 108 of triac 106. The dimmer 102 also includes an inductor choke 120 to smooth the dimmer output voltage $V_{\Phi\_DIM}$. As known in the art, an inductor choke is a passive two-terminal electronic component (e.g., an inductor) which is designed specifically for blocking higher-frequency alternating current (AC) in an electrical circuit, while allowing lower frequency or direct current to pass. Triac-based dimmer 102 also includes a capacitor 121 connected across triac 106 and inductor choke 120 to reduce electro-magnetic interference.

Ideally, modulating the phase angle of the dimmer output voltage $V_{\Phi\_DIM}$ effectively turns the lamp 142 OFF during time period $t_{OFF}$ and ON during time period $t_{ON}$ for each half cycle of the supply voltage $V_{SUPPLY}$. Thus, ideally, the dimmer 102 effectively controls the average energy supplied to lamp 142 in accordance with the dimmer output voltage $V_{\Phi\_DIM}$.

The triac-based dimmer 102 adequately functions in many circumstances, such as when lamp 142 consumes a relatively high amount of power, such as an incandescent light bulb. However, in circumstances in which dimmer 102 is loaded with a lower-power load (e.g., a light-emitting diode or LED lamp), such load may draw a small amount of current $i_{DIM}$, and it is possible that the current $i_{DIM}$ may fail to reach the attach current $i_{ATT}$ and also possible that current $i_{DIM}$ may prematurely drop below the holding current value $i_{HC}$ before the supply voltage $V_{SUPPLY}$ reaches approximately zero volts. If the current $i_{DIM}$ fails to reach the attach current $i_{ATT}$, dimmer 102 may prematurely disconnect and may not pass the appropriate portion of input voltage $V_{SUPPLY}$ to its output. If the current $i_{DIM}$ prematurely drops below the holding current value $i_{HC}$, the dimmer 102 prematurely shuts down, and the dimmer voltage $V_{\Phi\_DIM}$ will prematurely drop to zero. When the dimmer voltage $V_{\Phi\_DIM}$ prematurely drops to zero, the dimmer voltage $V_{\Phi\_DIM}$ does not reflect the intended dimming value as set by the resistance value of variable resistor 114. For example, when the current $i_{DIM}$ drops below the holding current value $i_{HC}$ at a time significantly earlier than $t_2$ for the dimmer voltage $V_{\Phi\_DIM}$ 206, the ON time period $t_{ON}$ prematurely ends at a time earlier than $t_2$ instead of ending at time $t_2$, thereby decreasing the amount of energy delivered to the load. Thus, the energy delivered to the load will not match the dimming level corresponding to the dimmer voltage $V_{\Phi\_DIM}$. In addition, when $V_{\Phi\_DIM}$ prematurely drops to zero, charge may accumulate on capacitor 118 and gate 108, causing triac 106 to again refire if gate voltage $V_G$ exceeds firing threshold value $V_F$ during the same half cycle 202 or 204, and/or causing triac 106 to fire incorrectly in subsequent half cycles due to such accumulated charge. Thus, premature disconnection of triac 106 may lead to errors in the timing circuitry of dimmer 102 and instability in its operation.

Dimming a light source with dimmers saves energy when operating a light source and also allows a user to adjust the intensity of the light source to a desired level. However, conventional dimmers, such as a triac-based leading-edge dimmer, that are designed for use with resistive loads, such as incandescent light bulbs, often do not perform well when attempting to supply a raw, phase modulated signal to a reactive load such as an electronic power converter or transformer.

Transformers present in a power infrastructure may include magnetic or electronic transformers. A magnetic transformer typically comprises two coils of conductive material (e.g., copper) each wrapped around a core of material having a high magnetic permeability (e.g., iron) such that magnetic flux passes through both coils. In operation, an electric current in the first coil may produce a changing magnetic field in the core, such that the changing magnetic field induces a voltage across the ends of the secondary winding via electromagnetic induction. Thus, a magnetic transformer may step voltage levels up or down while providing electrical isolation in a circuit between components coupled to the primary winding and components coupled to the secondary winding.

On the other hand, an electronic transformer is a device which behaves in the same manner as a conventional magnetic transformer in that it steps voltage levels up or down while providing isolation and can accommodate load current of any power factor. An electronic transformer generally includes power switches which convert a low-frequency (e.g., direct current to 400 Hertz) voltage wave to a high-frequency voltage wave (e.g., in the order of 10,000 Hertz). A comparatively small magnetic transformer may be coupled to such power switches and thus provides the voltage level transformation and isolation functions of the conventional magnetic transformer.

FIG. 3 depicts a lighting system 101 that includes a triac-based leading-edge dimmer 102 (e.g., such as that shown in FIG. 1), a magnetic transformer 122, and a lamp 142. Such a system may be used, for example, to transform a high voltage (e.g., 110V, 220 V) to a low voltage (e.g., 12 V) for use with a halogen lamp (e.g., an MR16 halogen lamp). FIG. 4 depicts example voltage and current graphs associated with lighting system 101. Referring to FIGS. 3 and 4, when dimmer 102 is used in connection with transformer 122 and a low-power lamp 142, the low power draw of lamp 142 may cause insufficient current $i_{DIM}$ to be drawn from dimmer 102 in order to meet the attach current and/or hold current requirements.

To further illustrate this potential problem, an equivalent circuit model for transformer 122 that represents the physical behavior of a magnetic transformer is depicted in FIG. 3. Parasitic effects present in transformer 122 are represented in an equivalent circuit model for transformer 122 by a primary side parasitic inductance 124 (with an inductance $L_p$) in series with a primary side parasitic resistance 126 (with a resistance $R_p$) and a secondary side parasitic inductance 132 (with an inductance $L_s$) in series with a secondary side parasitic resistance 134 (with an resistance $R_s$), which model losses and leakage reactances of the transformer coils. Parasitic effects are also represented by a "magnetizing branch" of the model comprising shunt leg parasitic inductance 128 (with an inductance $L_m$) in parallel with a shunt leg parasitic resistance 130 (with a resistance $R_m$), which model losses and leakage reactances of the transformer core. A magnetizing current $i_m$ flows to the shunt leg reactance representing current required to maintain mutual magnetic flux in the core. Those of ordinary skill in the art will appreciate that $i_{DIM}=i_s/N+i_m$, where $i_s$ is a secondary current of transformer 122 and N is the turns ratio of the transformer's primary and secondary side windings.

FIG. 4 depicts example waveforms for dimmer 102, such as output voltage $V_{\Phi\_DIM}$ 402, secondary voltage $V_s$ 404, magnetizing current $i_m$ 406, and the current $i_s/N$ 408 through the primary winding of transformer 122, assuming a three-wire dimmer. When loaded with transformer 122, the waveform $V_{\Phi\_DIM}$ 402 shown in FIG. 4 differs from that of waveform $V_{\Phi\_DIM}$ 206 shown in FIG. 2 due to reactances present in transformer 122, and in particular the presence of magnetizing current $i_m$. Starting at time $t_0$ in half cycle 410, despite a zero voltage $V_{\Phi\_DIM}$ at $t_0$, a magnetizing current $i_m$ 406 remains flowing in transformer 122 and may account for significantly all of the current $i_{DIM}$, thus inducing a voltage $V_s$ 404 rising in magnitude. At such time $t_0$, primary winding current $i_s/N$ may also begin increasing above zero. At a time $t_3$ occurring between time $t_0$ and time $t_1$, the sum of magnetizing current $i_m$ and primary winding current $i_s/N$ may reach a point at which the sum $i_{DIM}=i_s/N+i_m$ will decrease to an amount below the hold current $i_{HC}$, and dimmer 102 turns off. At time $t_1$, the dimmer may again turn on (e.g., $i_{DIM}>i_{ATT}$), and a magnetizing current $i_m$ and primary winding current $i_s/N$ may again appear. As seen in FIG. 4, throughout half cycle 412, waveforms 402, 404, and 408 are substantially equal in magnitude than they are throughout half cycle 410, but with opposite polarity. Accordingly, at a time $t_3'$ occurring between time $t_2$ and $t_1'$, the sum of magnetizing current $i_m$ and primary winding current $i_s/N$ may reach a point at which the sum $i_{DIM}=i_s/N+i_m$ will decrease to an amount below the hold current $i_{HC}$, and dimmer 102 turns off. In a three-wire dimmer, the time at which the dimmer turns on (e.g., $t_1$, $t_1'$) within each phase remains consistent, while in a two-wire dimmer, such times may vary from phase to phase.

Another particular type of phase-cutting dimmer is known as a trailing-edge dimmer A trailing-edge dimmer phase cuts from the end of an AC cycle, such that during the phase-cut angle, the dimmer is "off" and supplies no output voltage to its load, but is "on" before the phase-cut angle and in an ideal case passes a waveform proportional to its input voltage to its load.

FIG. 5 depicts a lighting system 500 that includes a trailing-edge, phase-cut dimmer 502 and a lamp 542. FIG. 6 depicts example voltage and current graphs associated with lighting system 500. Referring to FIGS. 5 and 6, lighting system 500 receives an AC supply voltage $V_{SUPPLY}$ from voltage supply 504. The supply voltage $V_{SUPPLY}$, indicated by voltage waveform 602, is, for example, a nominally 60 Hz/110 V line voltage in the United States of America or a nominally 50 Hz/220 V line voltage in Europe. Trailing edge dimmer 502 phase cuts trailing edges, such as trailing edges 602 and 604, of each half cycle of supply voltage $V_{SUPPLY}$. Since each half cycle of supply voltage $V_{SUPPLY}$ is 180 degrees of the supply voltage $V_{SUPPLY}$, the trailing edge dimmer 502 phase cuts the supply voltage $V_{SUPPLY}$ at an angle greater than 0 degrees and less than 180 degrees. The phase cut, input voltage $V_{\Phi\_DIM}$ to lamp 542 represents a dimming level that causes the lighting system 500 to adjust power delivered to lamp 542, and, thus, depending on the dimming level, increase or decrease the brightness of lamp 542.

Dimmer 502 includes a timer controller 510 that generates dimmer control signal DCS to control a duty cycle of switch 512. The duty cycle of switch 512 is a pulse width (e.g., times $t_1$-$t_0$) divided by a period of the dimmer control signal (e.g., times $t_3$-$t_0$) for each cycle of the dimmer control signal DCS. Timer controller 510 converts a desired dimming level into the duty cycle for switch 512. The duty cycle of the dimmer control signal DCS is decreased for lower dimming levels (i.e., higher brightness for lamp 542) and increased for higher dimming levels. During a pulse (e.g., pulse 606 and pulse 608) of the dimmer control signal DCS, switch 512 conducts (i.e., is "on"), and dimmer 502 enters a low resistance state. In the low resistance state of dimmer 502, the resistance of switch 512 is, for example, less than or equal to 10 ohms During the low resistance state of switch 512, the phase cut, input voltage $V_{\Phi\_DIM}$ tracks the input supply voltage $V_{SUPPLY}$ and dimmer 502 transfers a dimmer current $i_{DIM}$ to lamp 542.

When timer controller 510 causes the pulse of dimmer control signal 606 to end, dimmer control signal 606 turns switch 512 off, which causes dimmer 502 to enter a high resistance state (i.e., turns off). In the high resistance state of dimmer 502, the resistance of switch 512 is, for example, greater than 1 kiloohm. Dimmer 502 includes a capacitor 514, which charges to the supply voltage $V_{SUPPLY}$ during each pulse of the timer control signal DCS. In both the high and low resistance states of dimmer 502, the capacitor 514 remains connected across switch 512. When switch 512 is off and dimmer 502 enters the high resistance state, the voltage $V_C$ across capacitor 514 increases (e.g., between times $t_1$ and $t_2$ and between times $t_4$ and $t_5$). The rate of increase is a function of the amount of capacitance C of capacitor 514 and the input impedance of lamp 542. If effective input resistance of lamp 542 is low enough, it permits a high enough value of the dimmer current $i_{DIM}$ to allow the phase cut, input voltage $V_{\Phi\_DIM}$ to decay to a zero crossing (e.g., at times $t_2$ and $t_5$) before the next pulse of the dimmer control signal DCS.

Dimming a light source with dimmers saves energy when operating a light source and also allows a user to adjust the intensity of the light source to a desired level. However, conventional dimmers, such as a trailing-edge dimmer, that are designed for use with resistive loads, such as incandescent light bulbs, often do not perform well when supplying a raw, phase modulated signal to a reactive load such as a power converter or transformer, as is discussed in greater detail below.

FIG. 7 depicts a lighting system 501 that includes a trailing-edge, phase-cut dimmer 502, an electronic transformer 522, and a lamp 542. Such a system may be used, for example, to transform a high voltage (e.g., 110V, 220 V) to a low voltage (e.g., 12 V) for use with a halogen lamp (e.g., an MR16 halogen lamp). FIG. 8 depicts example voltage graphs associated with lighting system 501.

As is known in the art, electronic transformers operate on a principle of self-resonant circuitry. Referring to FIGS. 7 and 8, when dimmer 502 is used in connection with transformer 522 and a low-power lamp 542, the low current draw of lamp 542 may be insufficient to allow electronic transformer 522 to reliably self-oscillate.

To further illustrate, electronic transformer 522 may receive the dimmer output voltage $V_{\Phi\_DIM}$ at its input where it is rectified by a full-bridge rectifier formed by diodes 524. As voltage $V_{\Phi\_DIM}$ increases in magnitude, voltage on capacitor 526 may increase to a point where diac 528 will turn on, thus also turning on transistor 529. Once transistor 529 is on, capacitor 526 may be discharged and oscillation will start due to the self-resonance of switching transformer 530, which includes a primary winding ($T_{2a}$) and two secondary windings ($T_{2b}$ and $T_{2c}$). Accordingly, as depicted in FIG. 8, an oscillating output voltage $V_s$ 800 will be formed on the secondary of transformer 532 and delivered to lamp 542 while dimmer 502 is on, bounded by an AC voltage level proportional to $V_{\Phi\_DIM}$.

However, as mentioned above, many electronic transformers will not function properly with low-current loads. With a light load, there may be insufficient current through the primary winding of switching transformer 530 to sustain oscillation. For legacy applications, such as where lamp 542 is a 35-watt halogen bulb, lamp 542 may draw sufficient current to allow transformer 522 to sustain oscillation. However, should a lower-power lamp be used, such as a six-watt LED bulb, the current drawn by lamp 542 may be insufficient to sustain oscillation in transformer 522, which may lead to unreliable effects, such as visible flicker and a reduction in total light output below the level indicated by the dimmer.

FIG. 9 depicts a lighting system 901 that includes a triac-based leading-edge dimmer 102 (e.g., such as that shown in FIG. 1), an electronic transformer 522, and a lamp 542. Such a system 901 may be used, for example, to transform a high voltage (e.g., 110V, 220 V) to a low voltage (e.g., 12 V) for use with a halogen lamp (e.g., an MR16 halogen lamp). FIG. 10 depicts example voltage and current graphs associated with lighting system 901.

As is known in the art, electronic transformers operate on a principle of self-resonant circuitry. Referring to FIGS. 9 and 10, when dimmer 102 is used in connection with transformer 522 and a low-power lamp 542, the low current draw of lamp 542 may be insufficient to allow electronic transformer 522 to reliably self-oscillate.

To further illustrate, electronic transformer 522 may receive the dimmer output voltage $V_{\Phi\_DIM}$ at its input where it is rectified by a full-bridge rectifier formed by diodes 524. As voltage $V_{\Phi\_DIM}$ increases in magnitude at the dimmer firing point $t_1$, voltage on capacitor 526 may increase to a point where diac 528 will turn on, thus also turning on transistor 529. Once transistor 529 is on, capacitor 526 may be discharged and oscillation will start due to the self-resonance of switching transformer 530, which includes a primary winding ($T_{2a}$) and two secondary windings ($T_{2b}$ and $T_{2c}$). Accordingly, as depicted in FIG. 10, an oscillating output voltage $V_s$ 1008 will be formed on the secondary of transformer 532 and delivered to lamp 542 while dimmer 102 is on, bounded by an AC voltage level proportional to $V_{\Phi\_DIM}$.

However, as mentioned above, many electronic transformers will not function properly with low-current loads. With a light load, there may be insufficient current through the primary winding of switching transformer 530 to sustain oscillation. For legacy applications, such as where lamp 542 is a 35-watt halogen bulb, lamp 542 may draw sufficient current to allow transformer 522 to sustain oscillation. However, should a lower-power lamp be used, such as a six-watt LED bulb, the current drawn by lamp 542 may be insufficient to sustain oscillation in transformer 522, which may lead to unreliable effects, such as visible flicker and a reduction in total light output below the level indicated by the dimmer.

In addition, traditional approaches do not effectively detect or sense a type of transformer to which a lamp is coupled, further rendering it difficult to ensure compatibility between low-power (e.g., less than twelve watts) lamps and the power infrastructure to which they are applied.

SUMMARY

In accordance with the teachings of the present disclosure, certain disadvantages and problems associated with ensuring compatibility of a low-power lamp with a dimmer and a transformer may be reduced or eliminated.

In accordance with embodiments of the present disclosure, an apparatus may include a controller to provide compatibility between a load and a secondary winding of a transformer driven at its primary winding by a dimmer, wherein the controller is configured to: determine from a transformer secondary signal whether the transformer comprises a magnetic transformer or an electronic transformer; and select a compatibility mode of operation from a plurality of modes of operation based on the determination of whether the transformer comprises a magnetic transformer or an electronic transformer.

In accordance with these and other embodiments of the present disclosure, a method for providing compatibility between a load and a secondary winding of a transformer driven at its primary winding by a dimmer may include determining from a transformer secondary signal whether the transformer comprises a magnetic transformer or an electronic transformer and selecting a compatibility mode of operation from a plurality of modes of operation based on the determination of whether the transformer comprises a magnetic transformer or an electronic transformer.

In accordance with these and other embodiments of the present disclosure, an apparatus may include a controller to provide compatibility between a load and a secondary winding of a magnetic transformer driven at its primary winding by a trailing-edge dimmer, wherein the controller is configured to determine from a magnetic transformer secondary signal a period of a half-line cycle of an output signal of the dimmer, determine from the magnetic transformer secondary signal an estimated occurrence of an end of a phase-cut angle of the dimmer, and generate a driving signal to the load based on the period and the estimated occurrence of the end of the phase-cut angle.

In accordance with these and other embodiments of the present disclosure, a method for providing compatibility between a load and a secondary winding of a magnetic transformer driven at its primary winding by a trailing-edge dimmer may include determining from a magnetic transformer secondary signal a period of a half-line cycle of an output signal of the dimmer, determining from the magnetic transformer secondary signal an estimated occurrence of an end of a phase-cut angle of the dimmer, and generating a driving signal to the load based on the period and the estimated occurrence of the end of the phase-cut angle.

In accordance with these and other embodiments of the present disclosure, a lamp assembly may include a lamp for generating light and a controller for controlling operation of the lamp, the controller comprising a timing control circuit for determining a period of a periodic signal received by the lamp assembly.

In accordance with these and other embodiments of the present disclosure, an apparatus may include a controller to provide compatibility between a load and a secondary winding of an electronic transformer driven by a trailing-edge dimmer, wherein the controller is configured to predict based on an electronic transformer secondary signal an estimated occurrence of a high-resistance state of the trailing-edge dimmer, wherein the high-resistance state occurs when the trailing-edge dimmer begins phase-cutting an alternating current voltage signal and operating in a high-current mode for a period of time immediately prior to the estimated occurrence of the high-resistance state.

In accordance with these and other embodiments of the present disclosure, a method for providing compatibility between a load and a secondary winding of an electronic transformer driven by a trailing-edge dimmer may include predicting, based on on an electronic transformer secondary signal, an estimated occurrence of a high-resistance state of the trailing-edge dimmer, wherein the high-resistance state occurs when the trailing-edge dimmer begins phase-cutting an alternating current voltage signal and operating the load in a high-current mode for a period of time immediately prior to the estimated occurrence of the high-resistance state.

In accordance with these and other embodiments of the present disclosure, an apparatus may include a controller for selecting a compatibility mode of a lamp assembly, wherein the compatibility mode provides compatibility between the lamp assembly and a power infrastructure to which it is coupled, the power infrastructure including at least one of a type of dimmer and a type of transformer and coupled to the lamp assembly, and wherein the controller is configured to operate in a first compatibility mode of operation, determine from an input signal of the lamp assembly during operation in the first compatibility mode of operation whether the first compatibility mode of operation provides compatibility between the lamp assembly and the power infrastructure, select the first compatibility mode of operation from a plurality of modes of operation as a compatibility mode responsive to determining that the first compatibility mode of operation provides compatibility between the lamp assembly and the power infrastructure, and select a second compatibility mode of operation from the plurality of modes of operation as the compatibility mode responsive to determining that the first compatibility mode of operation does not provide compatibility between the lamp assembly and the power infrastructure.

In accordance with these and other embodiments of the present disclosure, a method may be provided for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly. The method may include operating the lamp assembly in a first compatibility mode of operation. The method may further include determining from an input signal of the lamp assembly during operation in the first compatibility mode of operation whether the first compatibility mode of operation provides compatibility between the lamp assembly and the power infrastructure. The method may also include selecting the first compatibility mode of operation from a plurality of modes of operation as a compatibility mode responsive to determining that the first compatibility mode of operation provides compatibility between the lamp assembly and the power infrastructure. The method may additionally include selecting a second compatibility mode of operation from the plurality of modes of operation as the compatibility mode responsive to determining that the first compatibility mode of operation does not provide compatibility between the lamp assembly and the power infrastructure.

In accordance with these and other embodiments of the present disclosure, an apparatus may include a controller for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly. The controller may be configured to sequentially operate the lamp assembly in at least a first compatibility mode of operation and a second compatibility mode of operation, determine whether either of the first compatibility mode of operation or the second compatibility mode of operation provides compatibility between the lamp assembly and the power infrastructure, and select a compatibility mode of operation based on whether either of the first compatibility mode of operation or the second compatibility mode of operation provides compatibility between the lamp assembly and the power infrastructure.

In accordance with these and other embodiments of the present disclosure, a method may be provided for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly. The method may include sequentially operating the lamp assembly in at least a first compatibility mode of operation and a second compatibility mode of operation. The method may further include determining whether either of the first compatibility mode of operation or the second compatibility mode of operation provides compatibility between the lamp assembly and the power infrastructure. The method may also include selecting a compatibility mode of operation based on whether either of the first compatibility mode of operation or the second compatibility mode of operation provides compatibility between the lamp assembly and the power infrastructure.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 11:
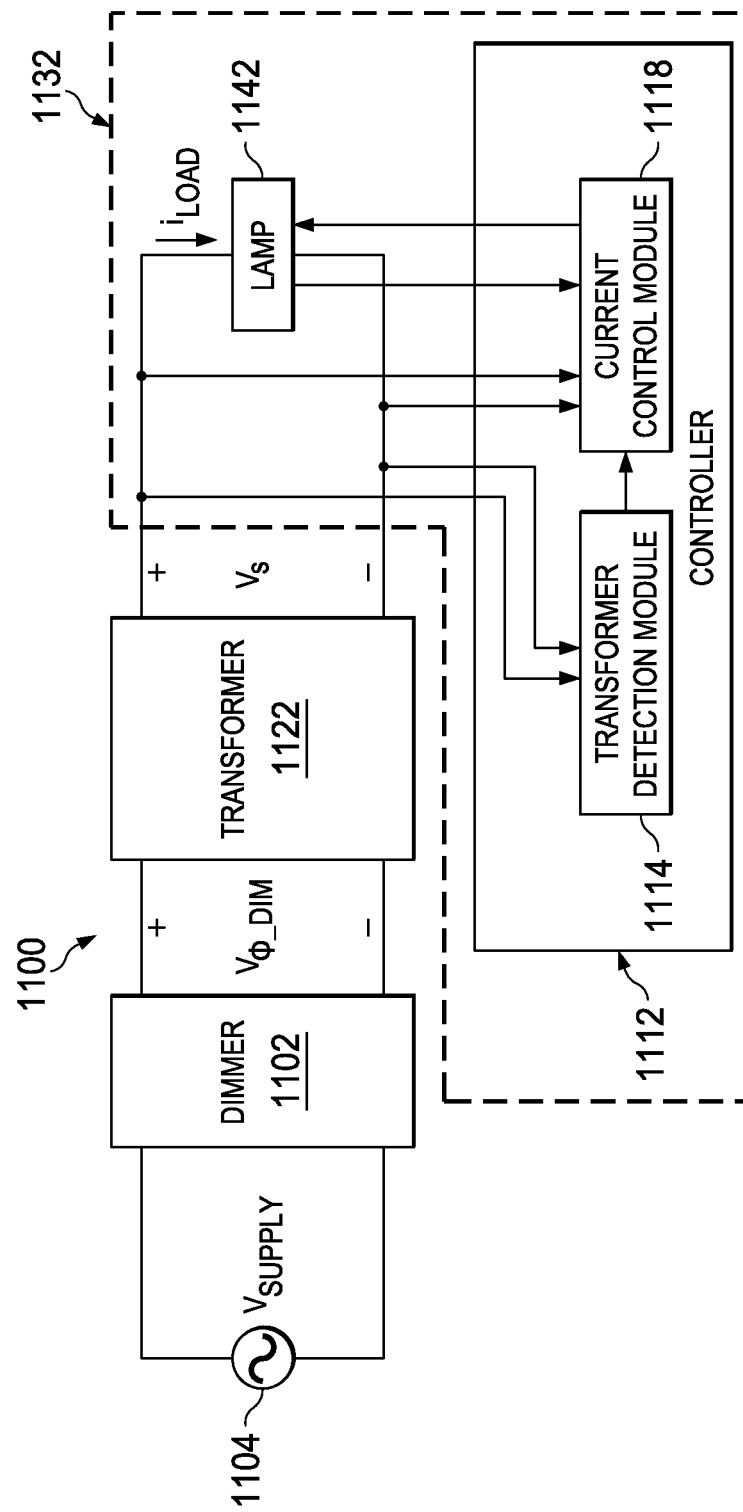
FIG. 11 illustrates an example lighting system including a controller for providing compatibility between a low-power lamp and other elements of a lighting system, in accordance with embodiments of the present disclosure.

FIG. 11 illustrates an example lighting system 1100 including a controller 1112 for providing compatibility between a low-power lamp 1142 and other elements of a lighting system, in accordance with embodiments of the present disclosure. As shown in FIG. 11, lightning system 1100 may include a voltage supply 1104, a dimmer 1102, a transformer 1122, a lamp 1142, and a controller 1112. Voltage supply 1104 may generate a supply voltage $V_{SUPPLY}$ that is, for example, a nominally 60 Hz/110 V line voltage in the United States of America or a nominally 50 Hz/220 V line voltage in Europe.

Figure 1:
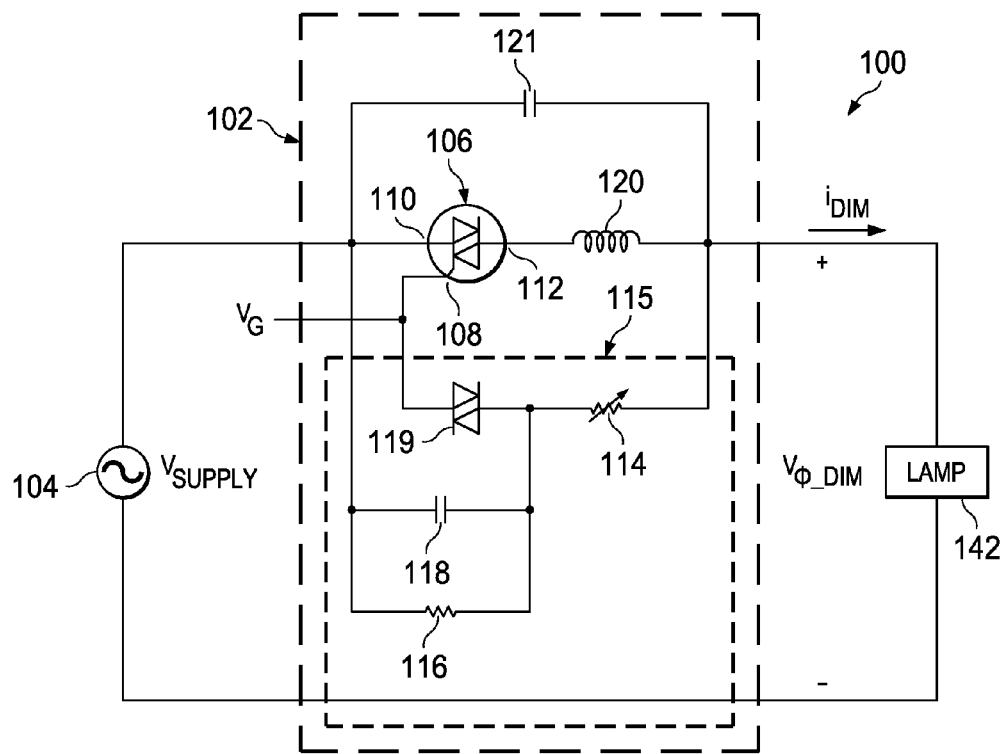
FIG. 1 illustrates a lighting system that includes a triac-based leading-edge dimmer, as is known in the art.
Figure 8:
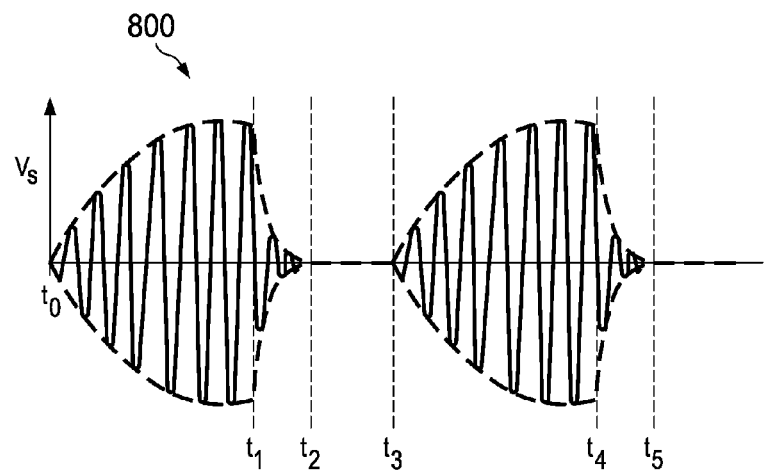
FIG. 8 illustrates example voltage and current graphs associated with the lighting system depicted in FIG. 7, as is known in the art.
Figure 2:
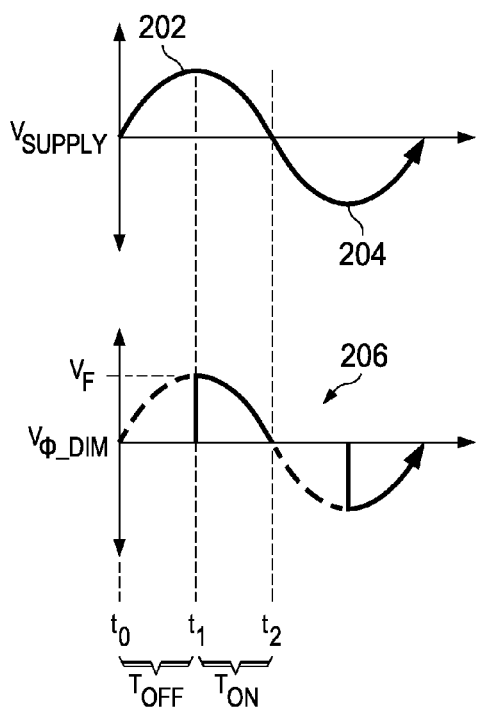
FIG. 2 illustrates example voltage and current graphs associated with the lighting system depicted in FIG. 1, as is known in the art.
Figure 3:
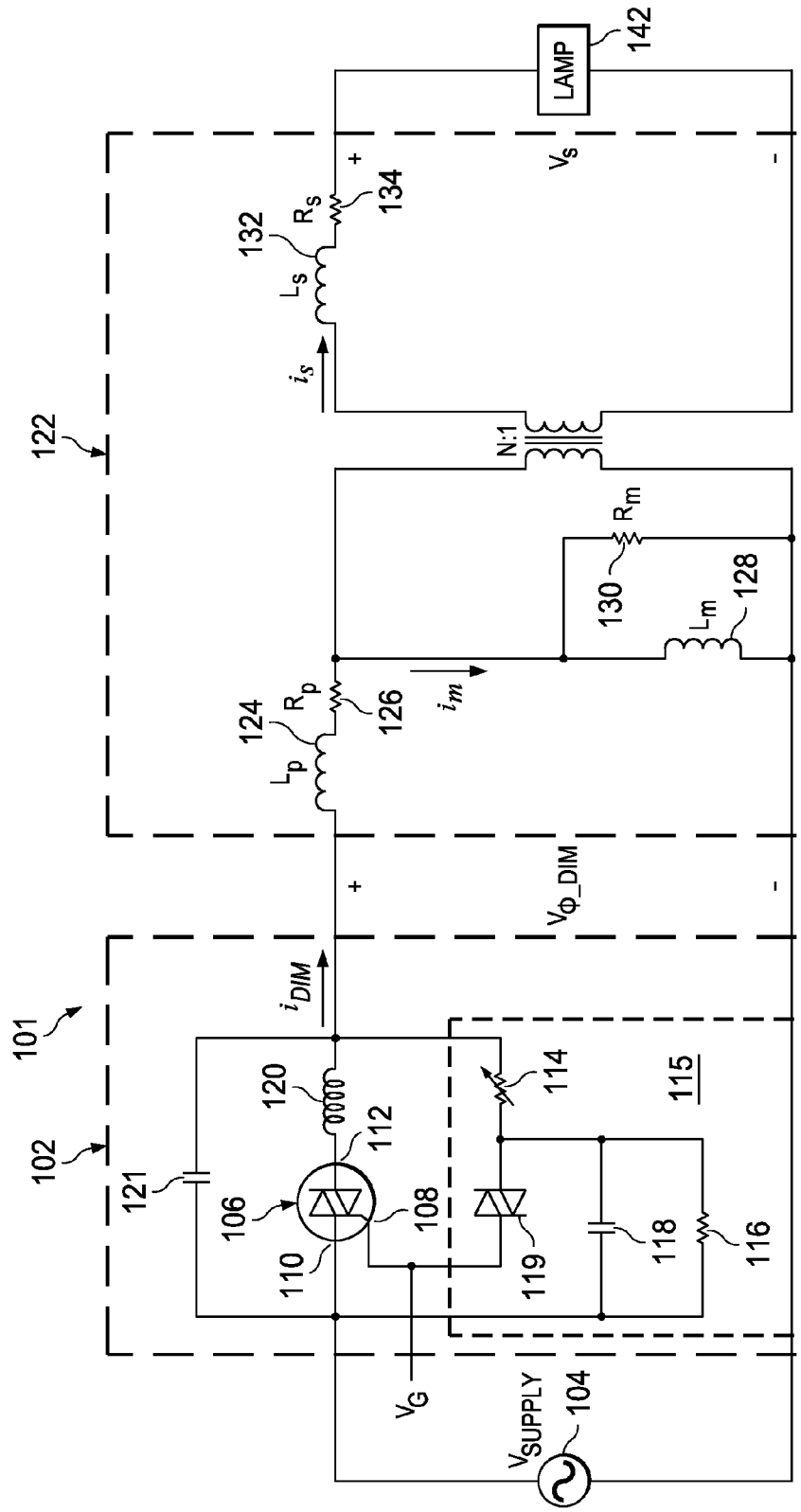
FIG. 3 illustrates a lighting system that includes a triac-based leading-edge dimmer and a magnetic transformer, as is known in the art.
Figure 5:
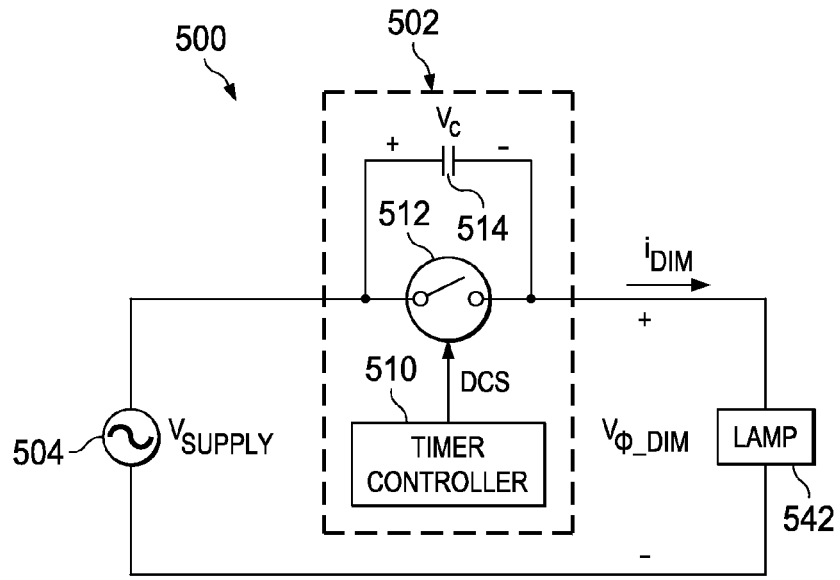
FIG. 5 illustrates a lighting system that includes a phase-cut trailing-edge dimmer, as is known in the art.
Figure 6:
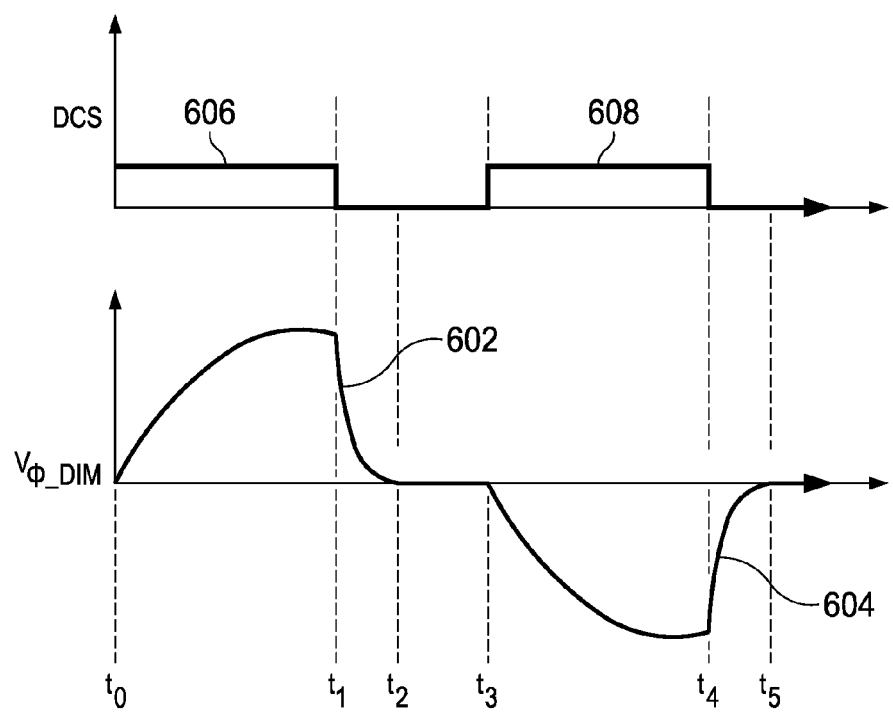
FIG. 6 illustrates example voltage and current graphs associated with the lighting system depicted in FIG. 5, as is known in the art.
Figure 7:
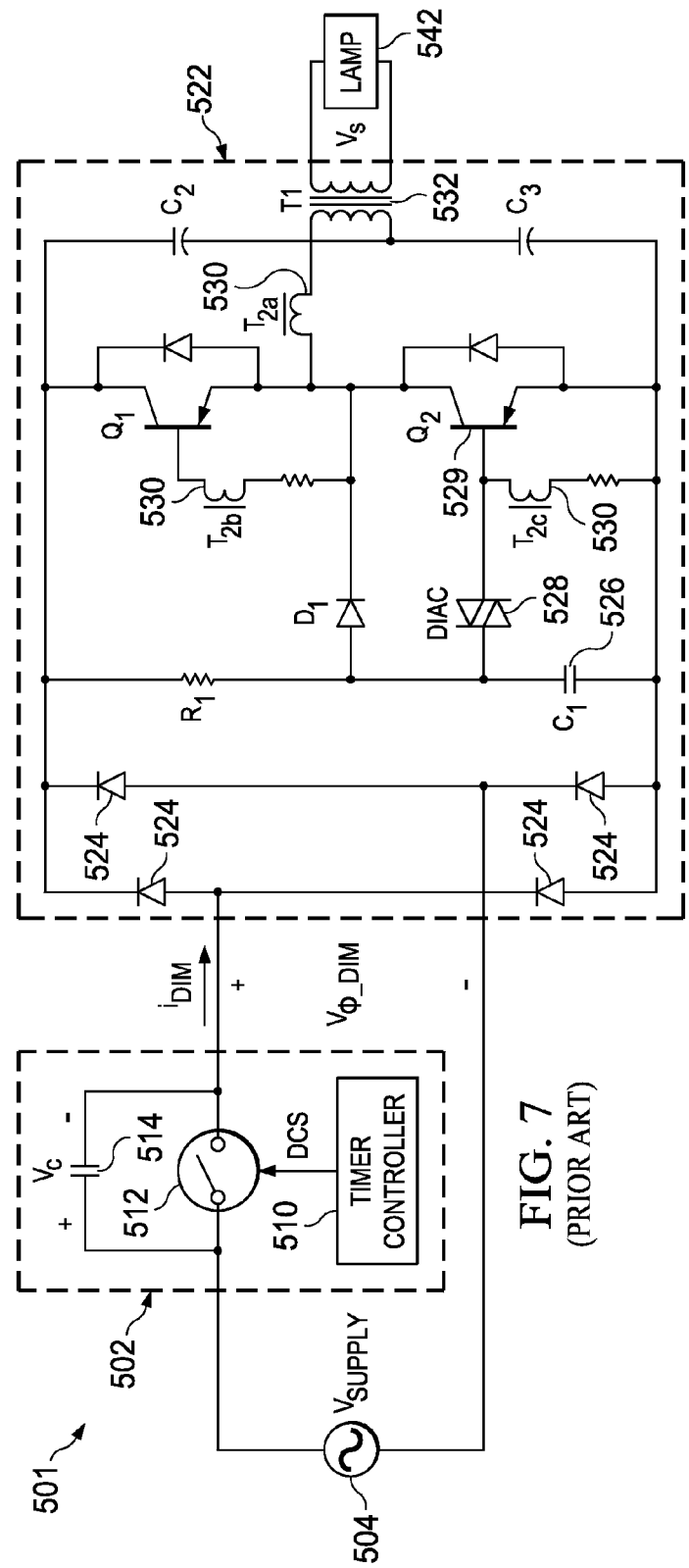
FIG. 7 illustrates a lighting system that includes a phase-cut trailing-edge dimmer and an electronic transformer, as is known in the art.

Dimmer 1102 may comprise any system, device, or apparatus for generating a dimming signal to other elements of lighting system 1100, the dimming signal representing a dimming level that causes lighting system 1100 to adjust power delivered to a lamp, and, thus, depending on the dimming level, increase or decrease the brightness of lamp 1142. Thus, dimmer 1102 may include a leading-edge dimmer similar or identical to that depicted in FIGS. 1 and 3, a trailing-edge dimmer similar to that depicted in FIGS. 5 and 7, or any other suitable dimmer.

Transformer 1122 may comprise any system, device, or apparatus for transferring energy by inductive coupling between winding circuits of transformer 1122. Thus, transformer 1122 may include a magnetic transformer similar or identical to that depicted in FIG. 3, an electronic transformer similar to that depicted in FIG. 7, or any other suitable transformer.

Lamp 1142 may comprise any system, device, or apparatus for converting electrical energy (e.g., delivered by transformer 1122) into photonic energy. In some embodiments, lamp 1142 may comprise a multifaceted reflector form factor (e.g., an MR16 form factor). In these and other embodiments, lamp 1142 may comprise an LED lamp.

Controller 1112 may comprise any system, device, or apparatus configured to, as described in greater detail elsewhere in this disclosure, determine from analyzing a transformer secondary signal whether transformer 1122 comprises a magnetic transformer or an electronic transformer, select a compatibility mode of operation from a plurality of modes of operation based on the determination of whether the transformer comprises a magnetic transformer or an electronic transformer, and operate lamp 1142 in accordance with such selected compatibility mode. As shown in FIG. 11, controller 1112 may comprise a transformer detection module 1114 and a current control module 1118.

As shown in FIG. 11, controller 1112 and lamp 1142 may be integral to the same lamp assembly 1132 (e.g., the same package), wherein such lamp assembly 1132 is configured to be electrically coupled to transformer 1122.

Transformer detection module 1114 may comprise any system, device, or apparatus configured to determine from analyzing a transformer secondary signal whether transformer 1122 comprises a magnetic transformer or an electronic transformer. In some embodiments, transformer detection module 1114 may be configured to determine whether transformer 1122 is a magnetic transformer or an electronic transformer based on a frequency of oscillation of the transformer secondary signal. For example, if the frequency of oscillation of the transformer secondary signal is greater than a particular predetermined threshold frequency, transformer detection module 1114 may determine that transformer 1122 is an electronic transformer, while if the frequency of oscillation of the transformer secondary signal is lesser than the same or a different predetermined threshold frequency, transformer detection module 1114 may determine that transformer 1122 is a magnetic transformer. An example embodiment of transformer detection module 1114 is depicted in FIG. 12.

Figure 12:
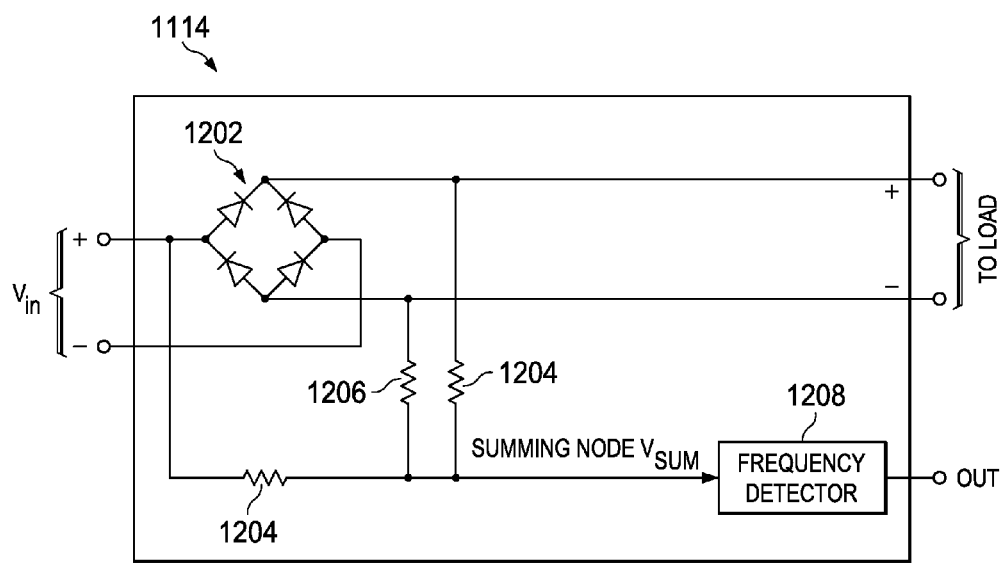
FIG. 12 illustrates an example transformer detection module, in accordance with embodiments of the present disclosure.
Figure 13A:
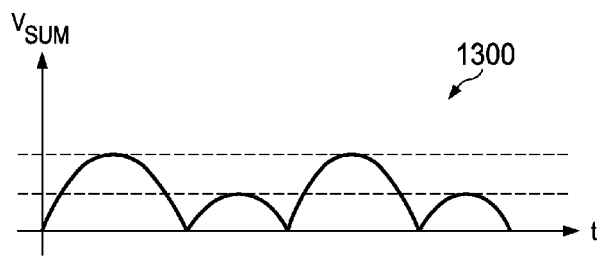
FIGS. 13A and 13B illustrate example voltage graphs associated with the transformer detection module illustrated in FIG. 12, in accordance with embodiments of the present disclosure.
Figure 13B:
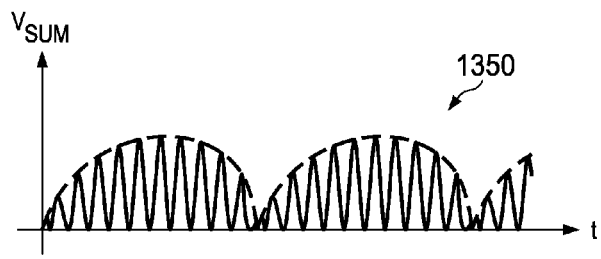

In the example embodiment of FIG. 12, transformer detection module 1114 may receive an input voltage $V_{in}$ which may be the output voltage of transformer 1122. Such input voltage may be rectified by bridge rectifier 1202 and two sense resistors 1204 may be coupled to each other at a summing node and to each of a positive polarity of the input voltage and a positive polarity of the output of rectifier 1202. Another resistor 1206 may be coupled between a negative polarity of the output of the rectifier and the sense resistors 1204 at the summing node in order to form a voltage divider such that a voltage $v_{sum}$ appears at the summing node. FIG. 13A depicts an example voltage waveform 1300 for voltage $v_{sum}$ at the summing node in the event that a magnetic transformer is present, while FIG. 13B depicts an example waveform 1350 for voltage $v_{sum}$ at the summing node in the event that an electronic transformer is present in accordance with embodiments of the present disclosure. As seen in FIGS. 13A and 13B, the frequency response of the summing node in the presence of a magnetic transformer is of a much lower frequency than that of the electronic transformer. Thus, frequency detector 1208, which may comprise any suitable system, device or apparatus for detecting the frequency of a periodic signal as is known by those in the art, may determine whether the frequency at the summing node is greater than a particular predetermined threshold frequency, and thus output a transformer indication signal indicating the presence of an electronic transformer, or may determine whether the frequency at the summing node is less than the same or a different predetermined threshold frequency, and thus output a transformer indication signal indicating presence of a magnetic transformer.

In addition, where a magnetic transformer is detected, frequency detector 1208 may also be able to determine phase imbalances between the phases of waveform 1300 based on different waveform amplitudes between the phases. Based on such determination, current control module 1118 may determine current drawn from magnetic transformer 1122 in each phase and correct for such imbalance, as described below.

Returning again to FIG. 11, current control module 1118 may receive the transformer indication signal from transformer detection module 1114 and, based on such signal, operate in one of a plurality of compatibility modes of operation, as described in greater detail elsewhere in this disclosure. For example, if the transformer indication signal indicates that transformer 1122 is a magnetic transformer, current control module 1118 may operate in a magnetic transformer compatibility mode of operation. Alternatively, if the transformer indication signal indicates that transformer 1122 is an electronic transformer, current control module 1118 may operate in an electronic transformer compatibility mode of operation.

Figure 14:
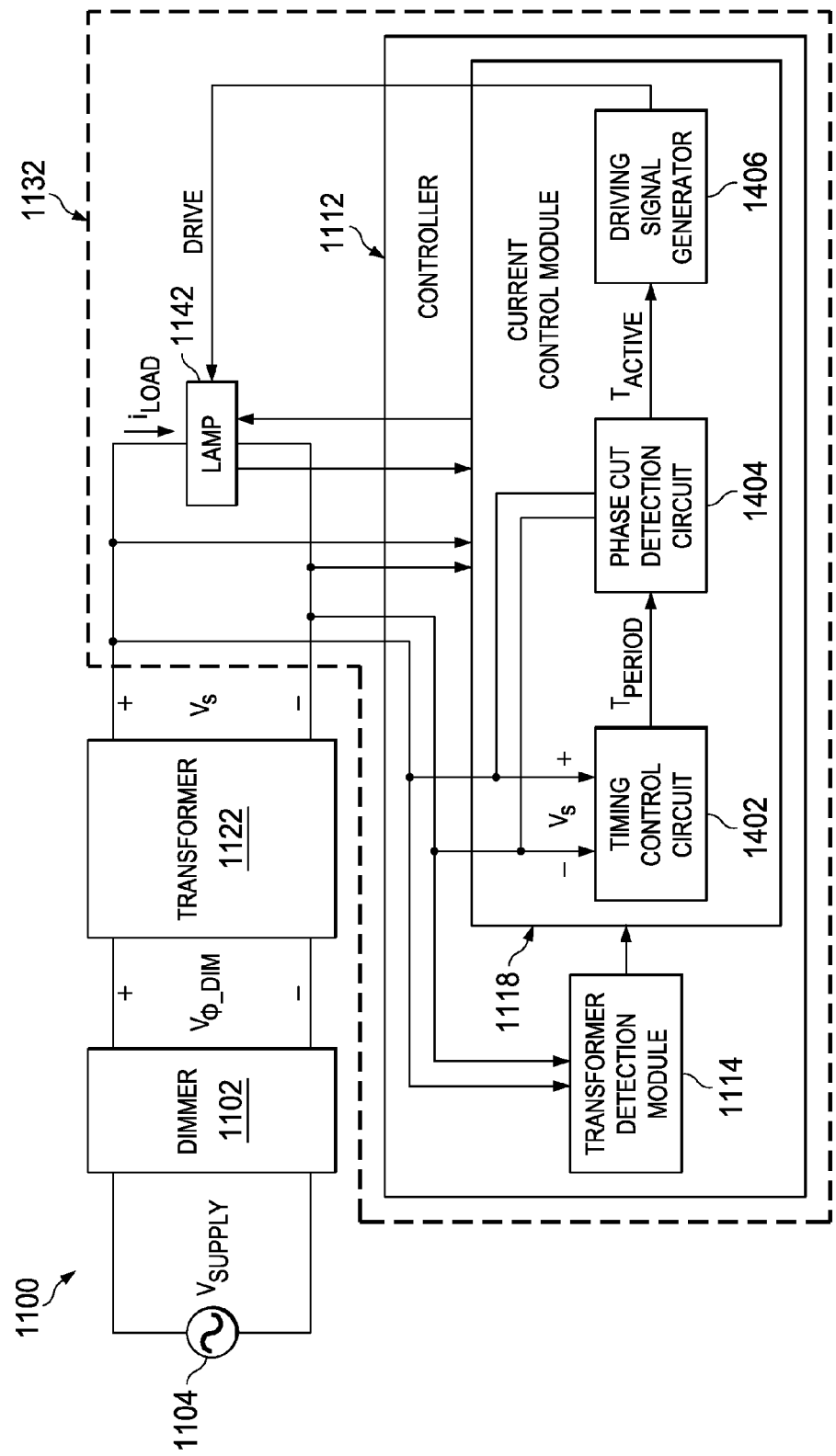
FIG. 14 illustrates the example lighting system of FIG. 11, with detail illustrating example components of a current control module for operating in a magnetic transformer compatibility mode of operation, in accordance with embodiments of the present disclosure.

FIG. 14 illustrates the example lighting system 1100 of FIG. 11, with detail illustrating example components of current control module 1118 for operating in a magnetic transformer compatibility mode of operation in accordance with embodiments of the present disclosure. For purposes of illustration, while current control module 1118 may include components for operating in an electronic transformer compatibility mode of operation, such components are not depicted in FIG. 14. As shown in FIG. 14, current control module 1118 may include a timing control circuit 1402, a phase cut detection circuit 1404, and driving signal generator 1406.

Timing control circuit 1402 may be any system, device, or apparatus configured to analyze a signal (e.g., transformer secondary voltage signal $V_s$) to determine a period of a half-line cycle of an output signal of dimmer 1102. In some embodiments, timing control circuit 1402 may comprise a phase-locked loop. In other embodiments, timing control circuit 1402 may comprise a delay-locked loop. Timing control circuit 1402 may communicate a signal $T_{period}$ indicative of the determined period of the half-line cycle to phase cut detection circuit 1404.

Figure 4:
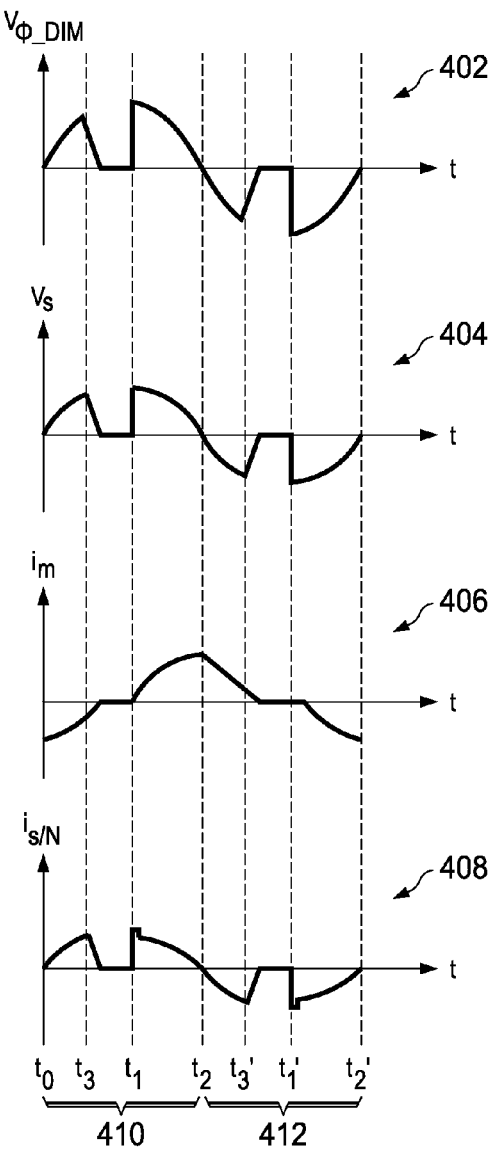
FIG. 4 illustrates example voltage and current graphs associated with the lighting system depicted in FIG. 3, as is known in the art.

Phase cut detection circuit 1404 may comprise any system, device, or apparatus configured to analyze a signal (e.g., transformer secondary voltage signal $V_s$) to determine an estimated occurrence of an end of a phase-cut angle of dimmer 1102 and based on the half-line cycle period and estimated occurrence of the end of the phase-cut angle, generate a signal indicative of the portion of the half-line cycle period in which dimmer 1102 is active (e.g., ON). Phase cut detection circuit 1404 may communicate a signal $T_{active}$ indicative of the portion of the half-line cycle period in which dimmer 1102 is active to driving signal generator 1406. For example, phase cut detection circuit 1404 may be configured to determine the estimated occurrence of the end of the phase-cut angle based on at least a determination of an estimated time at which transformer secondary voltage signal $V_s$ exceeds a predetermined threshold magnitude (e.g., so as to detect the occurrence of times analogous to times $t_1$, $t_1'$ depicted in FIG. 4). In addition or alternatively, phase cut detection circuit 1404 may be configured to determine the estimated occurrence of the end of the phase-cut angle based on at least a determination of an estimated time at which transformer secondary voltage signal $V_s$ falls below a predetermined threshold magnitude (e.g., so as to detect the occurrence of times analogous to times $t_3$, $t_3'$ depicted in FIG. 4). In addition or alternatively, phase cut detection circuit 1404 may be configured to determine the estimated occurrence of the end of the phase-cut angle based on at least a determination of an estimated continuous period of time in which transformer secondary voltage signal $V_s$ remains above a predetermined threshold magnitude. Such determination of a time or times in reference to one or more threshold magnitudes may be performed in any suitable manner, including use of one or more comparator circuits to determine the occurrence or occurrences of threshold crossing. Based on a further comparison of the timing of the estimated occurrence of such a threshold crossing relative to the signal periodicity generated by timing control circuit 1402, phase cut detection circuit 1404 may be able to determine the portion of the half-line cycle period in which dimmer 1102 is active.

In addition, driving signal generator 1406 may, based on a phase imbalance determined by transformer detection module, correct for such imbalance to make up for differing amplitudes flowing from transformer 1122.

Driving signal generator 1406 may comprise any system, device, or apparatus for receiving a signal indicative of a portion of a half-line cycle period in which dimmer 1102 is active and based on such signal, generate a driving signal indicative of an intensity of light to be generated by lamp 1142, and communicate such driving signal to lamp 1142. In some embodiments, driving signal generator 1406 may be configured to apply a mathematical function (e.g., a linear or polynomial function) to convert the signal indicative of a portion of a half-line cycle period in which dimmer 1102 is active to the driving signal. In other embodiments, driving signal 1406 may comprise a lookup table or other similar data structure in which various driving signal levels are indexed by values for the signal indicative of a portion of a half-line cycle period in which dimmer 1102 is active.

Figure 15:
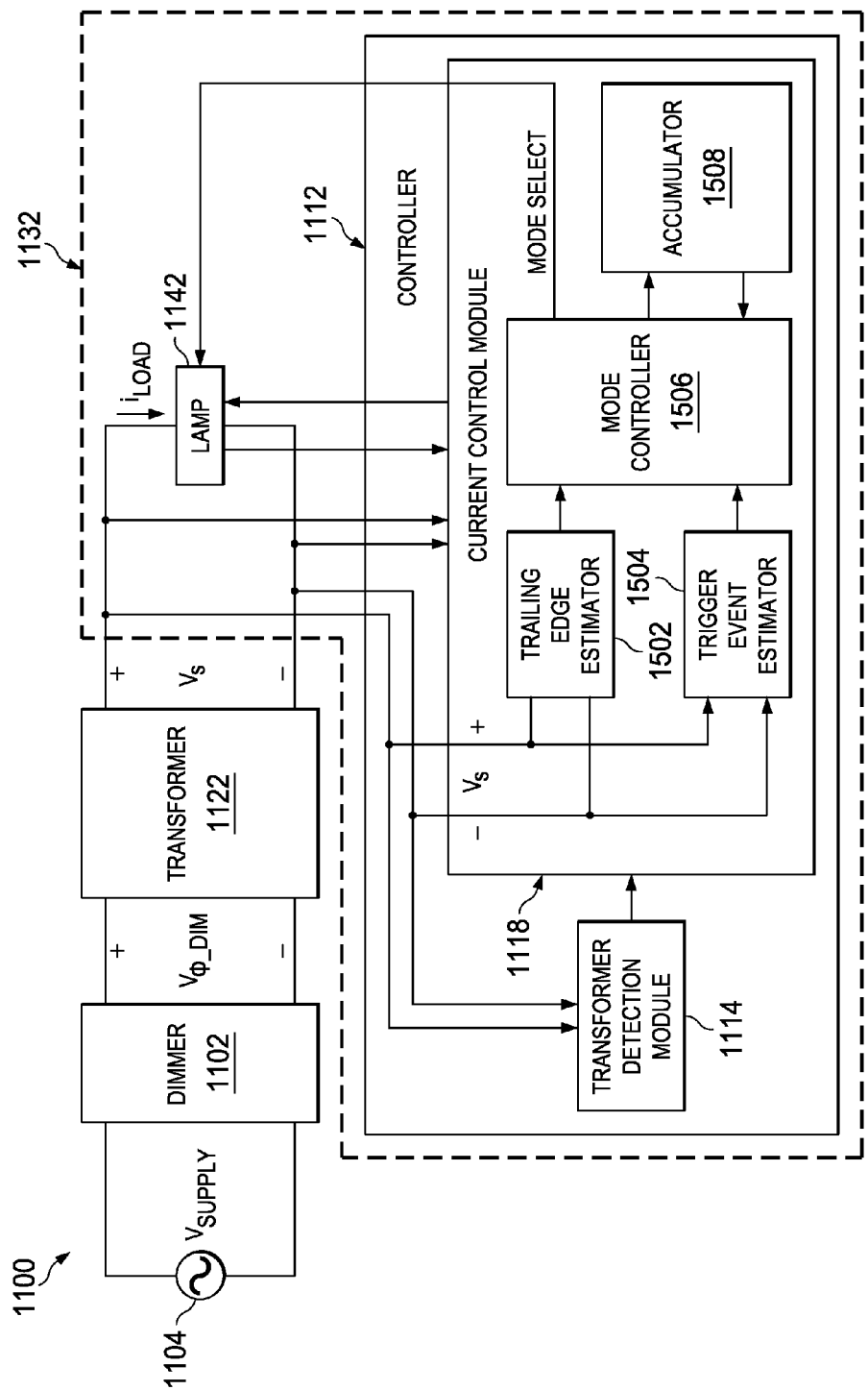
FIG. 15 illustrates the example lighting system of FIG. 11, with detail illustrating example components of a current control module for operating in an electronic transformer compatibility mode of operation, in accordance with embodiments of the present disclosure.
Figure 16:
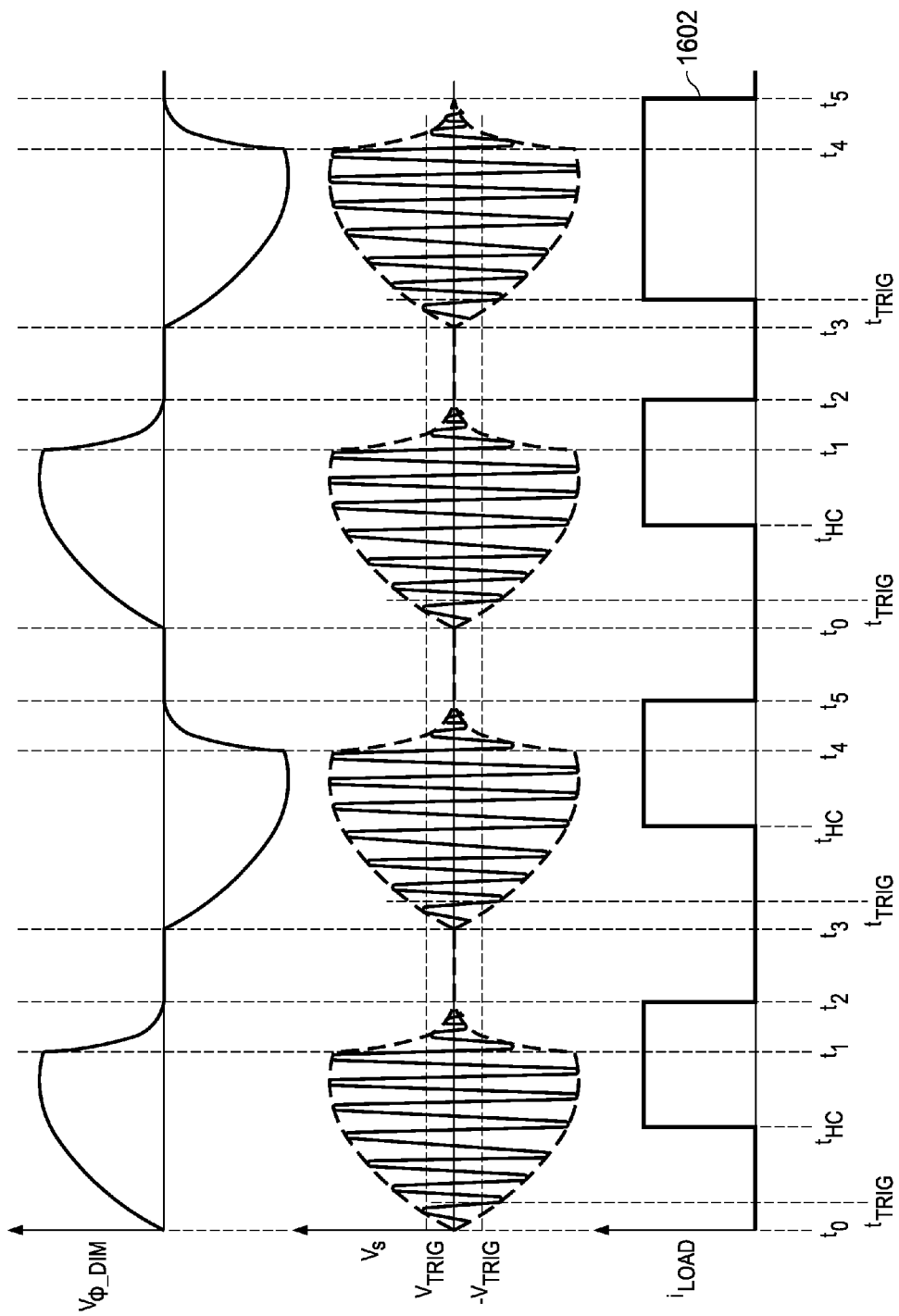
FIG. 16 depicts example voltage and current graphs associated with the lighting system depicted in FIG. 15, in accordance with embodiments of the present disclosure.

FIG. 15 illustrates the example lighting system 1100 of FIG. 11, with detail illustrating example components of current control module 1118 for operating in an electronic transformer compatibility mode of operation. FIG. 16 depicts example voltage and current graphs associated with lighting system 1100 depicted in FIG. 15, in accordance with embodiments of the present disclosure.

For purposes of illustration, while current control module 1118 may include components for operating in a magnetic transformer compatibility mode of operation, such components are not depicted in FIG. 15. As shown in FIG. 15, current control circuit 1118 may include a trailing edge estimator 1502, trigger event estimator 1504, mode controller 1506, and accumulator 1508.

Trailing edge estimator 1502 may include any system, device, or apparatus configured to, based on analysis of a transformer secondary signal $V_s$, predict an estimated occurrence of a high-resistance state of dimmer 1102, the high-resistance state occurring when the dimmer begins phase-cutting an alternating current voltage signal (e.g., where dimmer 1102 is a trailing-edge dimmer, the trailing edge). Thus, referring to FIG. 16, trailing edge estimator 1502 may predict or estimate the occurrence of times labeled $t_1$ and $t_4$. The estimated occurrence of the high-resistance state may be predicted in any suitable manner, for example, using systems and methods disclosed in U.S. patent application Ser. No. 13/298,002 filed Nov. 16, 2011 and entitled "Trailing Edge Dimmer Compatibility with Dimmer High Resistance Prediction," which is incorporated in its entirety herein for all purposes. Trailing edge estimator 1502 may communicate a trailing edge estimate signal indicative of the estimated occurrence of a high-resistance state of dimmer 1102 to mode controller 1506.

Trigger event estimator 1504 may include any system, device, or apparatus configured to, based on analysis of a transformer secondary signal $V_s$, predict an estimated occurrence of a trigger event of the electronic transformer, the trigger event corresponding to a rise in an output voltage of dimmer 1102. Thus, referring to FIG. 16, trigger event estimator 1504 may predict or estimate the occurrence of times labeled $t_0$ and $t_3$. In some embodiments, trigger event estimator 1504 may estimate the occurrence of the trigger event by determining a time at which voltage $V_s$ exceeds a threshold trigger voltage $v_{TRIG}$. Such determination of a time or times in reference to the threshold trigger voltage $v_{TRIG}$ may be performed in any suitable manner, including use of one or more comparator circuits to determine the occurrence or occurrences of threshold crossing. Trigger event estimator 1504 may communicate a trigger event estimate signal indicative of the estimated occurrence of the trigger event to mode controller 1506.

Mode controller 1506 may include any system, device, or apparatus configured to, based on a trailing edge estimate signal communicated from trailing edge estimator 1502, a trigger event estimate signal communicated from trigger event estimator 1504, and/or an accumulated error signal communicated from accumulator 1508, generate a mode select signal in order to select a particular mode for lamp 1142. For example, as shown by the waveform for lamp 1142, current $i_{LOAD}$ on FIG. 16, based on a control setting of dimmer 1102, mode controller 1506 may cause current control module 1118 (and thus lamp 1142) to operate in a high-current mode from a period beginning at a high-current mode start time $t_{HC}$ and ending at approximately the estimated occurrence of the high-resistance state of dimmer 1102, (e.g., a time $t_2$ or $t_5$, once voltage $V_S$ has decayed to zero). Such control setting of dimmer 1102 is thus estimated based on the estimated occurrence of a high-resistance state of dimmer 1102 as indicated by the trailing edge estimate signal and the estimated occurrence of the trigger event as indicated by the trailing edge estimate signal. Mode controller 1506 may determine the high-current mode start time $t_{HC}$ based on the accumulated error signal communicated from accumulator 1508 in order to correct for errors in the amount of energy delivered to lamp 1142 in previously occurring cycles of voltage $V_s$, as described in greater detail below.

As another example, based on the estimated occurrence of a high-resistance state of dimmer 1102 as indicated by the trailing edge estimate signal and the estimated occurrence of a trigger event as indicated by the trigger event estimate signal, mode controller 1506 may cause current control module 1118 (and thus lamp 1142) to operate in a low-impedance mode from a period beginning at the high-resistance state of dimmer 1102 (e.g., a time $t_2$ or $t_5$) and ending at the subsequent trigger event time $t_{TRIG}$. During such low-impedance mode, output voltages of dimmer 1102 and transformer 1122 may be kept low in order to permit dimmer 1102 to reset for its next phase-cut cycle.

As a further example, based on the estimated occurrence of a trigger event as indicated by the trigger event estimate signal, mode controller 1506 may cause current control module 1118 (and thus lamp 1142) to operate in a high-impedance mode from a period beginning at the trigger event time $t_{TRIG}$ and ending at the beginning of the subsequent high-current mode occurring at a time $t_{HC}$.

Thus, based on a trailing edge estimate signal communicated from trailing edge estimator 1502, a trigger event estimate signal communicated from trigger event estimator 1504, and/or an accumulated error signal communicated from accumulator 1508, mode controller 1506 may sequentially and cyclically operate in the high-current mode, the low-impedance mode, and the high-impedance mode.

Mode controller 1506 may additionally be configured to, during each particular operation in the high-current mode, determine a target amount of energy to be delivered to lamp 1142 during the particular operation of the high-current mode. In some embodiments, such target amount of energy may be based on a control setting of dimmer 1102, and an estimate of such control setting may be made by calculating the aggregate duration of the high-current mode and the high-impedance mode. In addition, mode controller 1506 may be configured to, during the particular operation of the high-current mode, determine an estimated delivered amount of energy actually delivered to lamp 1142. In some embodiments, such estimated delivered amount of energy may be calculated based on the duration of the high-current mode. Furthermore, mode controller 1506 may be configured to calculate an error based on the difference between the target amount of energy and the estimated delivered amount of energy, and calculate an error signal to accumulator 1508 based on such error.

Accumulator 1508 may include any system, device, or apparatus configured to, based on an error signal communicated from mode controller 1506, calculate an accumulated error accumulated during multiple preceding operations in the high-current mode, and communicate an accumulated error signal to mode controller 1506 indicative of such accumulated error. As discussed above, such accumulated error signal may be used by mode controller 1506 to determine a duration of a high-current mode (e.g., high-current mode start time $t_{HC}$ may be modulated as a function of the accumulated error). Thus, an error accumulated during one or more operations in the high-current mode may be corrected, in whole or part, in one or more subsequent operations in the high-current mode by varying the duration of high-current modes.

In addition to varying the duration of high-current modes, mode controller 1506 may correct for error by causing the duration for a particular operation in the high-current mode to begin at the estimated occurrence of the trigger event, as shown by pulse 1602 in FIG. 16. An operation in the high-current mode having such a duration may be referred to as a "probe event." In some embodiments, mode controller 1506 may cause a probe event to occur for each n-th operation of the high-current mode, where n is a positive integer. In particular embodiments, n may be an odd positive integer. When a probe event occurs, mode controller 1506 may eliminate the high-impedance mode that would have otherwise occurred immediately preceding the high-current mode comprising the probe event.

Figure 17:
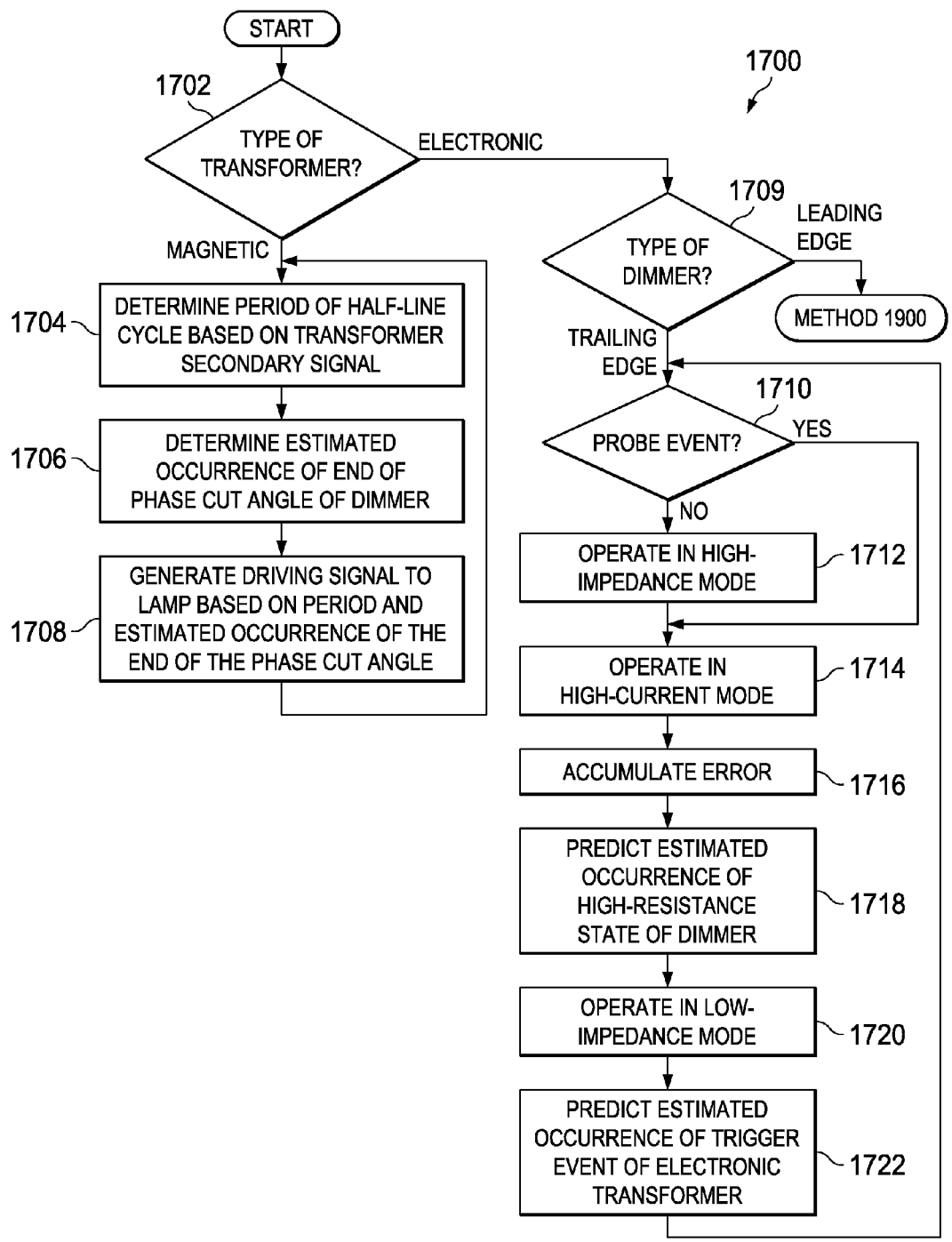
FIG. 17 illustrates a flow chart of an example method for ensuring compatibility between a lamp and a transformer driver by a dimmer, in accordance with embodiments of the present disclosure.

FIG. 17 illustrates a flow chart of an example method 1700 for ensuring compatibility between a lamp and a transformer driver by a dimmer, in accordance with embodiments of the present disclosure. According to some embodiments, method 1700 may begin at step 1702. As noted above, teachings of the present disclosure may be implemented in a variety of configurations of lighting system 1100. As such, the preferred initialization point for method 1700 and the order of the steps comprising method 1700 may depend on the implementation chosen.

Figure 20:
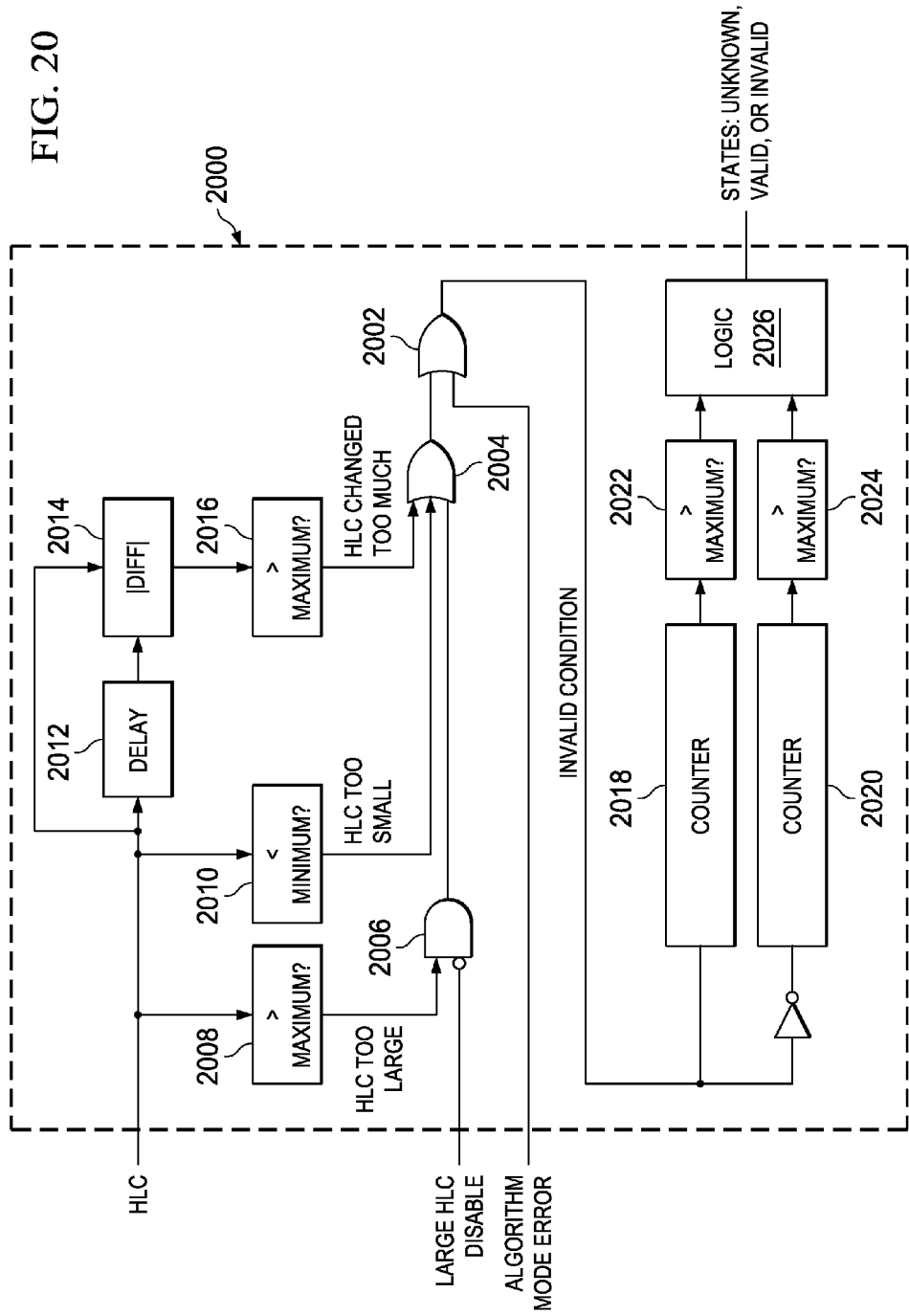
FIG. 20 illustrates a block diagram of an example compatibility mode selection system and method for determining whether or not a then-active compatibility mode is operating within predefined parameters.
Figure 21:
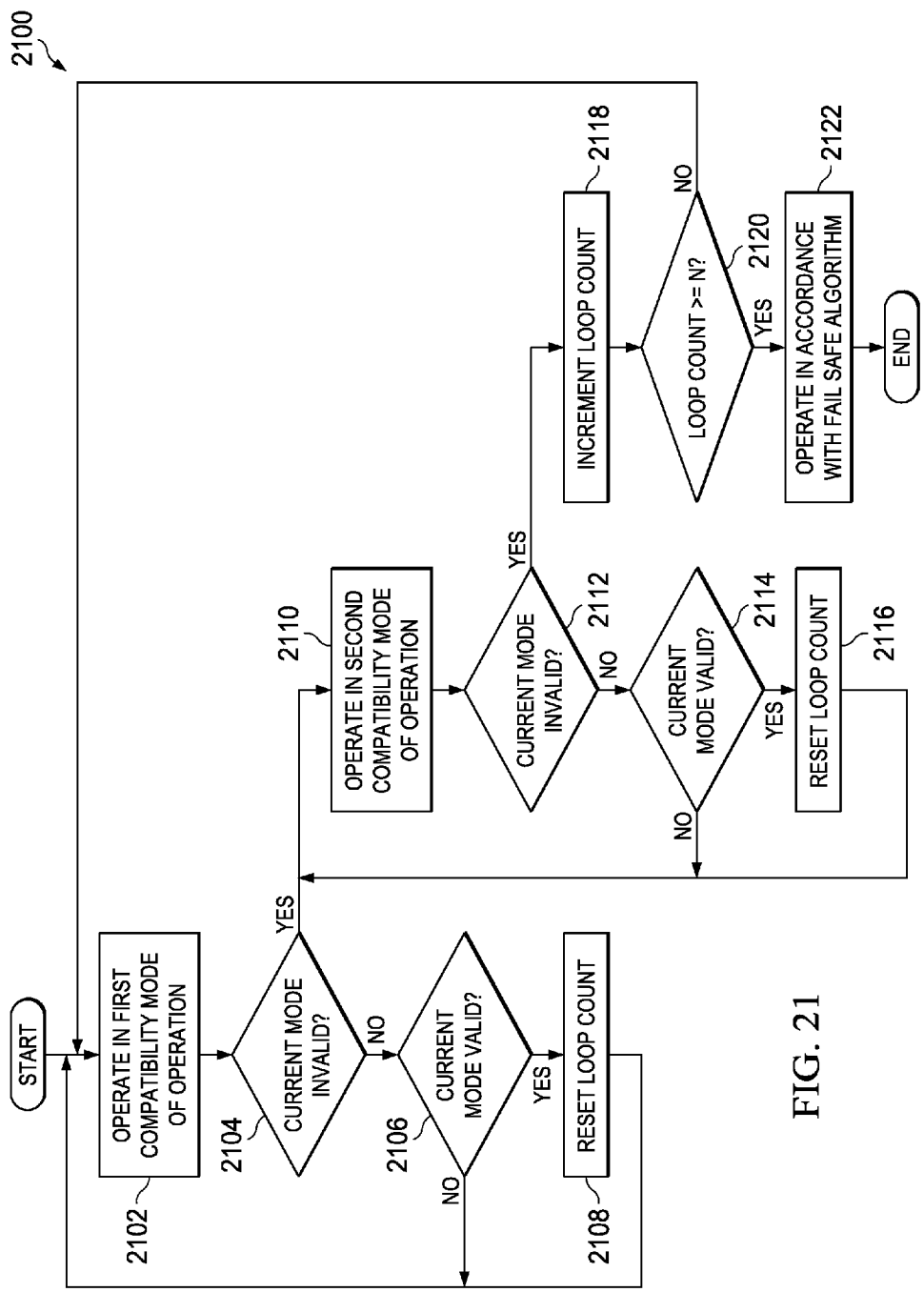
FIG. 21 illustrates a flow chart of an example method for selecting a compatibility mode of operation for providing compatibility between a low-power lamp and a power infrastructure to which it is coupled, in accordance with embodiments of the present disclosure.

At step 1702, controller 1112 may determine the transformer type of transformer 1122 (e.g., in accordance with the approach described with respect to FIGS. 12, 13A, and 13B or in accordance with the approach described with respect to FIGS. 20 and 21). Controller 1112 may make such determination based on a frequency of oscillation of a secondary voltage signal (e.g., $V_s$) of transformer 1122, as described elsewhere in this disclosure. If controller 1112 determines transformer 1122 to be a magnetic transformer, method 1700 may proceed to step 1704. Otherwise, if controller 1112 determines transformer 1122 to be an electronic transformer, method 1700 may proceed to step 1703.

At step 1704, controller 1112 may analyze the voltage signal of the secondary of transformer 1122 to determine a period of a half-line cycle of an output signal of dimmer 1102. In some embodiments, such determination may be made by a timing control circuit (e.g., a phase-locked loop or a delay-locked loop).

At step 1706, controller 1112 may analyze the voltage signal of the secondary of transformer 1122 to determine an estimated occurrence of an end of a phase-cut angle of dimmer 1102. Controller 1112 may determine the estimated occurrence of the end of the phase cut angle based at least on: (a) a determination of an estimated time at which the voltage of the secondary winding of transformer 1122 exceeds a predetermined threshold magnitude; (b) a determination of an estimated time at which the voltage of transformer 1122 falls below the same or a different predetermined threshold magnitude; and/or (c) a determination of an estimated portion of the period in which the magnetic transformer secondary signal is greater than the same or a different predetermined threshold magnitude.

At step 1708, controller 1112 may generate a driving signal to lamp 1142 based on the period and the estimated occurrence of the end of the phase-cut angle, the driving signal indicative of intensity of light to be generated by lamp 1142. After completion of step 1708, method 1700 may return to step 1704, and steps 1704 to 1708 may repeat indefinitely.

As indicated before, if controller 1112 determines transformer 1122 to be an electronic transformer, method 1700 may proceed to step 1709. At step 1709, controller 1112 may determine (e.g., in accordance with the approach described with respect to FIGS. 20 and 21) whether the electronic transformer is coupled at its primary winding to a trailing-edge dimmer or a leading-edge dimmer. If coupled to a trailing-edge dimmer, method 1700 may proceed to step 1710. Otherwise, if coupled to a leading-edge dimmer, operation may proceed to method 1900 described with respect to FIG. 19.

At step 1710, controller 1112 may determine if the subsequent operation in the high-current mode is a probe event. Such probe event may occur for each n-th operation in the high-current mode, where n is a positive integer, and in some embodiments is an odd positive integer. If the subsequent operation in the high-current mode is a probe event, method 1700 may proceed to step 1714, where the period of the operation in the high-current mode may run from the subsequent estimated occurrence of the trigger event to the subsequent estimated occurrence of the high-resistance state of dimmer 1102. Otherwise, if the subsequent operation in the high-current mode is not a probe event, method 1700 may proceed to step 1712.

At step 1712, from approximately the estimated occurrence of the subsequent trigger event to the beginning of the subsequent high-current mode, controller 1112 may operate in a high-impedance mode.

At step 1714, controller 1112 may operate in a high-current mode for a period of time immediately prior to the occurrence of the low-impedance mode. The period of time may be based on a control setting of dimmer 1102, and such control setting of dimmer 1102 may be estimated based on the estimated occurrence of a high-resistance state of dimmer 1102 as indicated by the trailing edge estimate signal and the estimated occurrence of the trigger event as indicated by the trailing edge estimate signal. Mode controller 1506 may determine the period of time of the high-current mode based on the accumulated error signal communicated from accumulator 1508 in order to correct for errors in the amount of energy delivered to lamp 1142 in previously occurring cycles of steps 1710 to 1722, as described in greater detail elsewhere in this disclosure.

At step 1716, controller 1112 may calculate an error for the operation of the high-current mode occurring at step 1714. The error may be calculated as a difference between a target amount of energy to be delivered to lamp 1142 during the operation in the high-current mode and an estimated delivered amount of energy actually delivered to lamp 1142 during the operation in the high-current mode. The target amount of energy may be based on a control setting of dimmer 1102, which control setting may be estimated based on a period of time between the estimated occurrence of the trigger event and the estimated occurrence of the high-resistance state of dimmer 1102. The estimated amount of delivered energy may be estimated based on the period of time of the high-current mode. Controller 1112 may add such calculated error to an accumulated error representing an aggregation of errors from previous operations in the high-current mode. Such accumulated error may be used by controller 1112 in determining the period of time for subsequent operations in the high-current mode.

At step 1718, controller 1112 may predict based on analysis of the voltage signal of the secondary of transformer 1122 an estimated occurrence of a high-resistance state of the dimmer 1102 (e.g., when dimmer 1102 begins phase-cutting an AC voltage signal at its input).

At step 1720, from approximately the estimated occurrence of the high-resistance state of dimmer 1102 to approximately the estimated occurrence of the subsequent trigger event, controller 1112 may operate in a low-impedance mode.

At step 1722, controller 1112 may predict an estimated occurrence of a trigger event of transformer 1122, the trigger event corresponding to a rise in an output voltage of dimmer 1102. After completion of step 1722, method 1700 may proceed again to step 1710, and steps 1710 to 1722 may repeat indefinitely.

Although FIG. 17 discloses a particular number of steps to be taken with respect to method 1700, method 1700 may be executed with greater or lesser steps than those depicted in FIG. 17. In addition, although FIG. 17 discloses a certain order of steps to be taken with respect to method 1700, the steps comprising method 1700 may be completed in any suitable order.

Method 1700 may be implemented using controller 1112 or any other system operable to implement method 1700. In certain embodiments, method 1700 may be implemented partially or fully in software and/or firmware embodied in computer-readable media.

Figure 18:
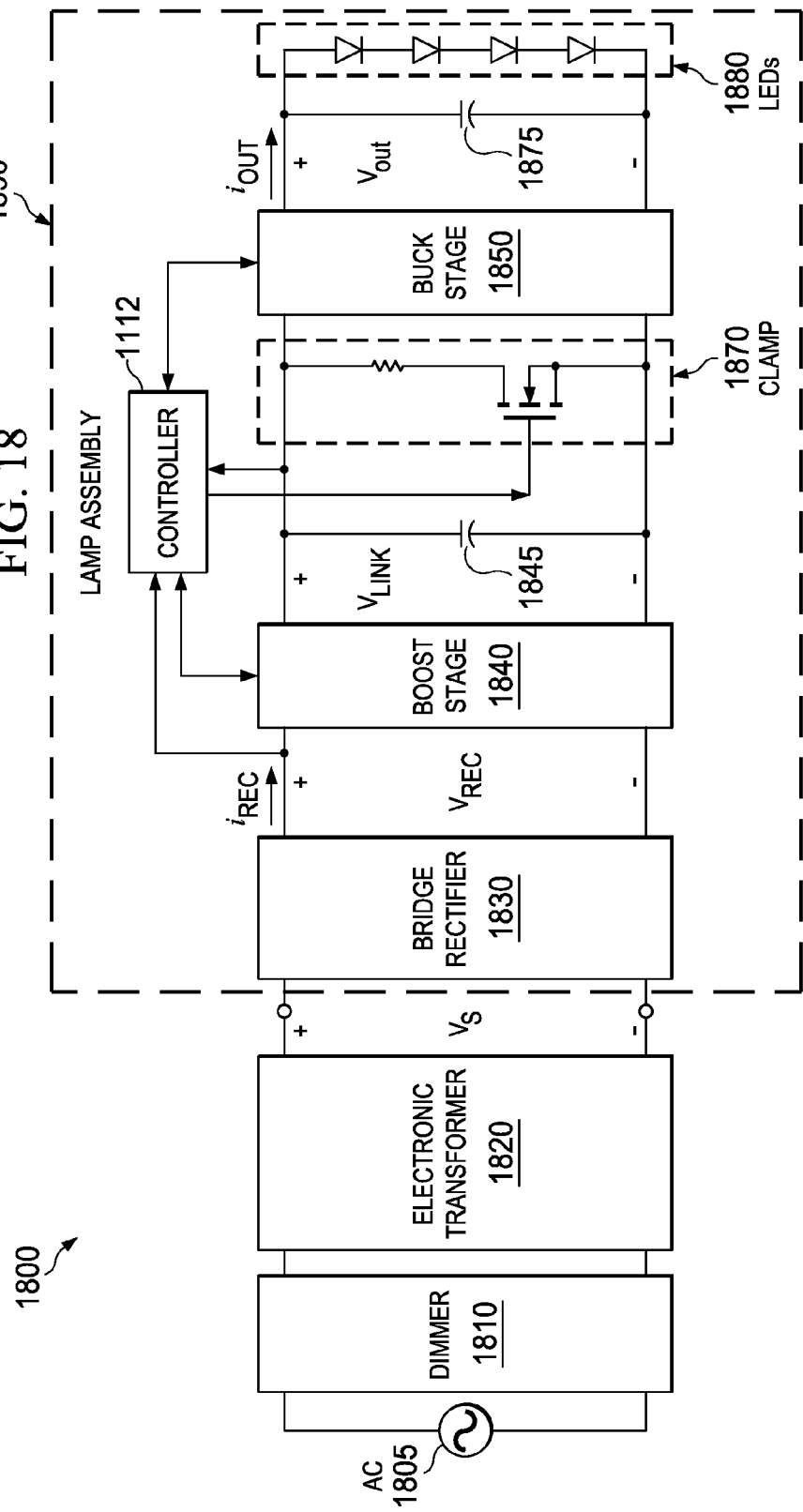
FIG. 18 illustrates an example lighting system including a controller for providing compatibility between a low-power lamp and other elements of a lighting system, in accordance with embodiments of the present disclosure.

FIG. 18 illustrates an example lighting system 1800 including a controller 1112 integral to a lamp assembly 1890 for providing compatibility between a low-power light source (e.g., LEDs 1880) and other elements of lighting system 1800, in accordance with embodiments of the present disclosure. As shown in FIG. 18, lightning system 1800 may include a voltage supply 1805, a leading-edge dimmer 1810, an electronic transformer 1820, and a lamp assembly 1890. Voltage supply 1805 may generate a supply voltage that is, for example, a nominally 60 Hz/110 V line voltage in the United States of America or a nominally 50 Hz/220 V line voltage in Europe.

Figure 9:
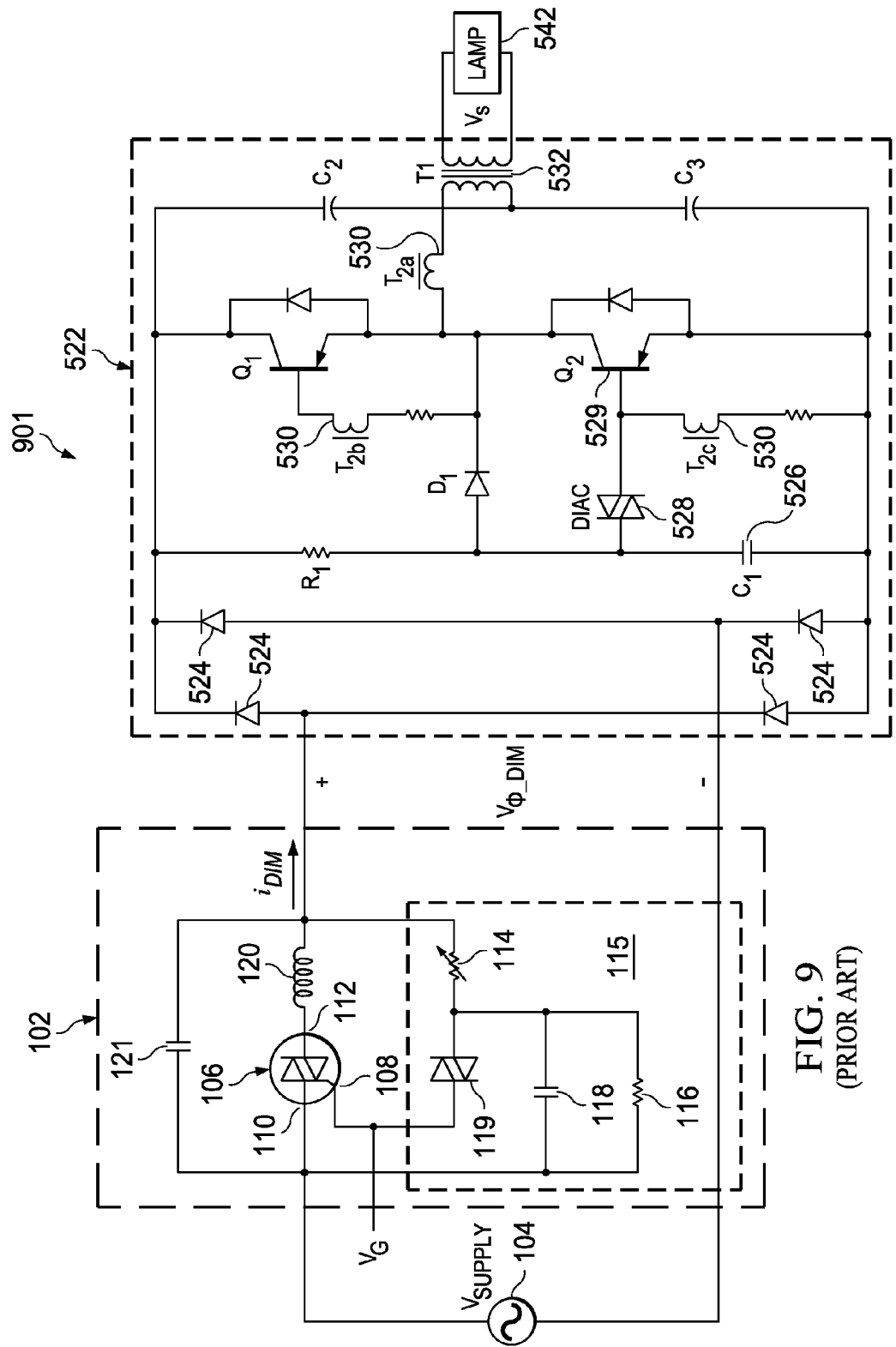
FIG. 9 illustrates a lighting system that includes a triac-based leading-edge dimmer and an electronic transformer, as is known in the art.
Figure 10:
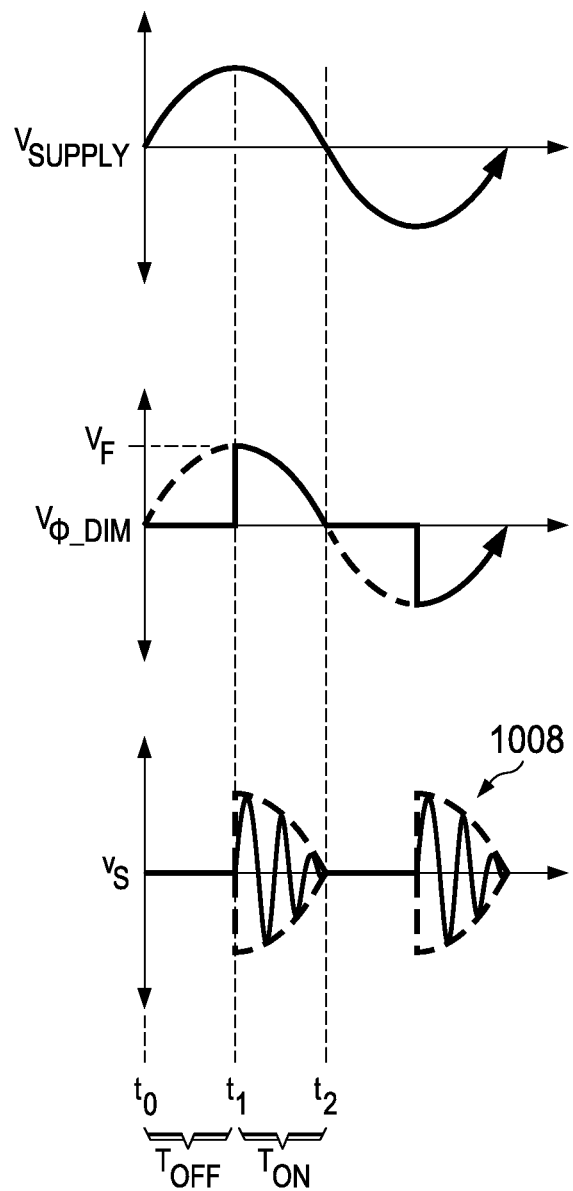
FIG. 10 illustrates example voltage and current graphs associated with the lighting system depicted in FIG. 9, as is known in the art.

Leading-edge dimmer 1810 may comprise any system, device, or apparatus for generating a dimming signal to other elements of lighting system 1800, the dimming signal representing a dimming level that causes lighting system 1800 to adjust power delivered to lamp assembly 1890, and, thus, depending on the dimming level, increase or decrease the brightness of LEDs 1880 or another light source integral to lamp assembly 1890. Thus, leading-edge dimmer 1810 may include a leading-edge dimmer similar or identical to that depicted in FIG. 9.

Electronic transformer 1820 may comprise any system, device, or apparatus for transferring energy by inductive coupling between winding circuits of transformer 1820. Thus, electronic transformer 1820 may include a magnetic transformer similar or identical to that depicted in FIG. 9, or any other suitable transformer.

Lamp assembly 1890 may comprise any system, device, or apparatus for converting electrical energy (e.g., delivered by electronic transformer 1820) into photonic energy (e.g., at LEDs 1880). In some embodiments, lamp assembly 1890 may comprise a multifaceted reflector form factor (e.g., an MR16 form factor). In these and other embodiments, lamp assembly 1890 may comprise an LED lamp. As shown in FIG. 18, lamp assembly 1890 may include a bridge rectifier 1830, a boost converter stage 1840, a link capacitor 1845, a buck converter stage 1850, a load capacitor 1875, a power-dissipating clamp 1870, LEDs 1880, and a controller 1112.

Bridge rectifier 1830 may comprise any suitable electrical or electronic device as is known in the art for converting the whole of alternating current voltage signal $v_s$ into a rectified voltage signal $v_{REC}$ having only one polarity.

Boost converter stage 1840 may comprise any system, device, or apparatus configured to convert an input voltage (e.g., $v_{REC}$) to a higher output voltage (e.g., $v_{LINK}$) wherein the conversion is based on a control signal (e.g., a control signal communicated from controller 1112, as explained in greater detail below). Similarly, buck converter stage 1850 may comprise any system, device, or apparatus configured to convert an input voltage (e.g., $v_{LINK}$) to a lower output voltage (e.g., $v_{OUT}$) wherein the conversion is based on another control signal (e.g., another control signal communicated from controller 1112, as explained in greater detail below).

Each of link capacitor 1845 and output capacitor 1875 may comprise any system, device, or apparatus to store energy in an electric field. Link capacitor 1845 may be configured such that it stores energy generated by boost converter stage 1840 in the form of the voltage $v_{LINK}$. Output capacitor 1875 may be configured such that it stores energy generated by buck converter stage 1850 in the form of the voltage $v_{OUT}$.

Power-dissipating clamp 1870 may comprise any system, device, or apparatus configured to, when selectively activated, dissipate energy stored on link capacitor 1845, thus decreasing voltage $v_{LINK}$. In embodiments represented by FIG. 18, clamp 1870 may comprise a resistor in series with a switch (e.g., a transistor), such that clamp 1870 may be selectively enabled and disabled based on a control signal communicated from controller 1112 for controlling the switch.

LEDs 1880 may comprise one or more light-emitting diodes configured to emit photonic energy in an amount based on the voltage $v_{OUT}$ across the LEDs 1880.

Controller 1112 may comprise any system, device, or apparatus configured to, as described in greater detail elsewhere in this disclosure, determine a voltage $v_{REC}$ present at the input of boost converter stage 1840 and control an amount of current $i_{REC}$ drawn by the boost converter stage and/or control an amount of current $i_{OUT}$ delivered by buck stage 1850 based on such voltage $v_{REC}$. In addition or alternatively, controller 1112 may be configured to, as described in greater detail elsewhere in this disclosure, determine a voltage $v_{LINK}$ present at the output of boost converter stage 1840 and control an amount of current $i_{OUT}$ delivered by buck stage 1850 and/or selectively enable and disable clamp 1870 based on such voltage $v_{LINK}$.

In operation, controller 1112 may, when power is available from electronic transformer 1820 and based on a measured voltage $v_{REC}$, generate current $i_{REC}$ inversely proportional to $v_{REC}$ (e.g., $i_{REC} = P/v_{REC}$, where P is a predetermined power, as described elsewhere in this disclosure). Thus, as voltage $v_{REC}$ increases, controller 1112 may cause current $i_{REC}$ to decrease, and as voltage $v_{REC}$ decreases, controller 1112 may cause current $i_{REC}$ to increase. In addition, controller 1112 may cause buck converter stage 1850 to output a constant current in an amount necessary to regulate voltage $v_{LINK}$ at a voltage level well above the maximum output voltage $v_s$ of electronic transformer 1820, as described in greater detail elsewhere in this disclosure.

To regulate voltage $v_{LINK}$, controller 1112 may sense voltage $v_{LINK}$ and control the current $i_{OUT}$ generated by buck converter stage 1850 based on the sensed voltage $v_{LINK}$. For example, if voltage $v_{LINK}$ falls below a first undervoltage threshold, such event may indicate that buck converter stage 1850 is drawing more power than boost converter stage 1840 can supply. In response, controller 1112 may cause buck converter stage 1850 to decrease the current $i_{OUT}$ until voltage $v_{LINK}$ is no longer below the first undervoltage threshold. In some embodiments, controller 1112 may implement a low-pass filter via which current $i_{OUT}$ is decreased, in order to prevent oscillation or hard steps in the visible light output of LEDs 1880. As another example, should voltage $v_{LINK}$ fall below a second undervoltage threshold with a magnitude lower than the first undervoltage threshold, the bandwidth of the low-pass filter implemented by controller 1112 may be increased for as long as voltage $v_{LINK}$ remains below the second undervoltage threshold, in order to prevent voltage $v_{LINK}$ from collapsing to the point in which it can no longer be regulated.

As a further example, if voltage $v_{LINK}$ rises above a maximum threshold voltage, such event may indicate that boost converter stage 1840 is generating more power than buck converter stage 1850 can consume. In response, controller 1112 may cause buck converter stage 1850 to increase the current $i_{OUT}$ until voltage $v_{LINK}$ is no longer above the maximum threshold voltage. In some embodiments, controller 1112 may implement a low-pass filter via which current $i_{OUT}$ is increased, in order to prevent oscillation or hard steps in the visible light output of LEDs 1880. In addition or alternatively, responsive to voltage $v_{LINK}$ rising above the maximum threshold voltage, controller 1112 may activate power-dissipating clamp 1870 to reduce voltage $v_{LINK}$.

Accordingly, controller 1112, in concert with boost converter stage 1840, buck converter stage 1850, and clamp 1870, may provide an input current waveform $i_{REC}$ which increases as voltage $v_{REC}$ decreases and decreases as voltage $v_{REC}$ increases, and provides hysteretic power regulation of the output of boost converter stage 1840. In some embodiments, controller 1112 may meet the requirement of increasing current $i_{REC}$ with decreasing voltage $v_{REC}$ and decreasing current $i_{REC}$ with increasing voltage $v_{REC}$ by producing a substantially constant power across the AC waveform of $v_{REC}$.

As described above, an electronic transformer is designed to operate on a principle of self-oscillation, wherein current feedback from its output current is used to force oscillation of the electronic transformer. If the load current is below the current necessary to activate transistor base currents (e.g., in transistor 529 depicted in FIG. 9) in the positive feedback loop of the electronic transformer, oscillation may fail to sustain itself, and the output voltage and output current of the electronic transformer will fall to zero.

In lighting system 1800, because boost converter stage 1840 is generating a substantially constant power proportional to the dimmer output, the current drawn from electronic transformer 1820 is a minimum when the voltage $v_{REC}$ (and thus voltage $v_s$) is at its maximum magnitude. With many electronic transformers, such minimum current may fall below the current necessary to sustain oscillation in the electronic transformer. This failure to maintain oscillation results in a lack of energy available from the transformer and ultimately results in an output at LEDs 1880 below the desired value.

Accordingly, in addition to the functionality described above, controller 1112 may also implement a servo loop to control the power value used to calculate current $i_{REC}$ based on voltage $v_{REC}$. In accordance with such servo loop, controller 1112 may generate current $i_{REC}$ in accordance with the equation $i_{REC} = aP/v_{REC}$, wherein a is a dimensionless variable multiplier having a value based on at least one of voltage $v_{REC}$ and an output power generated by buck converter stage 1850 (as described in greater detail below), and P is a rated power of LEDs 1880. At startup of controller 1112, controller 1112 may set a to its maximum value (e.g., 2). For increasing phase angles of dimmer 1810, the current drawn by boost converter stage 1840 will be at an elevated level ($i_{REC}=aP/v_{REC}$, where a is at its maximum), until the power output of buck converter stage 1850 reaches its maximum (e.g., P) and clamp 1870 remains activated. At this point, because output power of buck converter stage 1850 is at its maximum, the power generated by boost converter stage 1840 may be reduced and still maintain generation of the same existing light output on LEDs 1880. Thus, because output power of buck converter stage 1850 is at its maximum and clamp 1870 is activated (e.g., voltage $v_{LINK}$ is above the aforementioned maximum threshold voltage), controller 1112 may decrease the value of a until either clamp 1870 is no longer activated (e.g., voltage $v_{LINK}$ is no longer above the aforementioned maximum threshold voltage) or a reaches its minimum level (e.g., a=1, corresponding to power generation of boost converter stage 1840 being equal to rated power of LEDs 1880). Conversely, when the phase angle of dimmer 1810 is decreased and voltage $v_{LINK}$ begins approaching the aforementioned first threshold, controller 1112 may increase a. Once a is increased to its maximum value (e.g., a=2), controller 1112 may decrease current $i_{OUT}$ based on voltage $v_{LINK}$, as described above.

In some embodiments, controller 1112 may include a microprocessor, microcontroller, digital signal processor (DSP), application specific integrated circuit (ASIC), or any other digital or analog circuitry configured to interpret and/or execute program instructions and/or process data. In some embodiments, controller 1112 may interpret and/or execute program instructions and/or process data stored in a memory (not explicitly shown) communicatively coupled to controller 1112.

Figure 19:
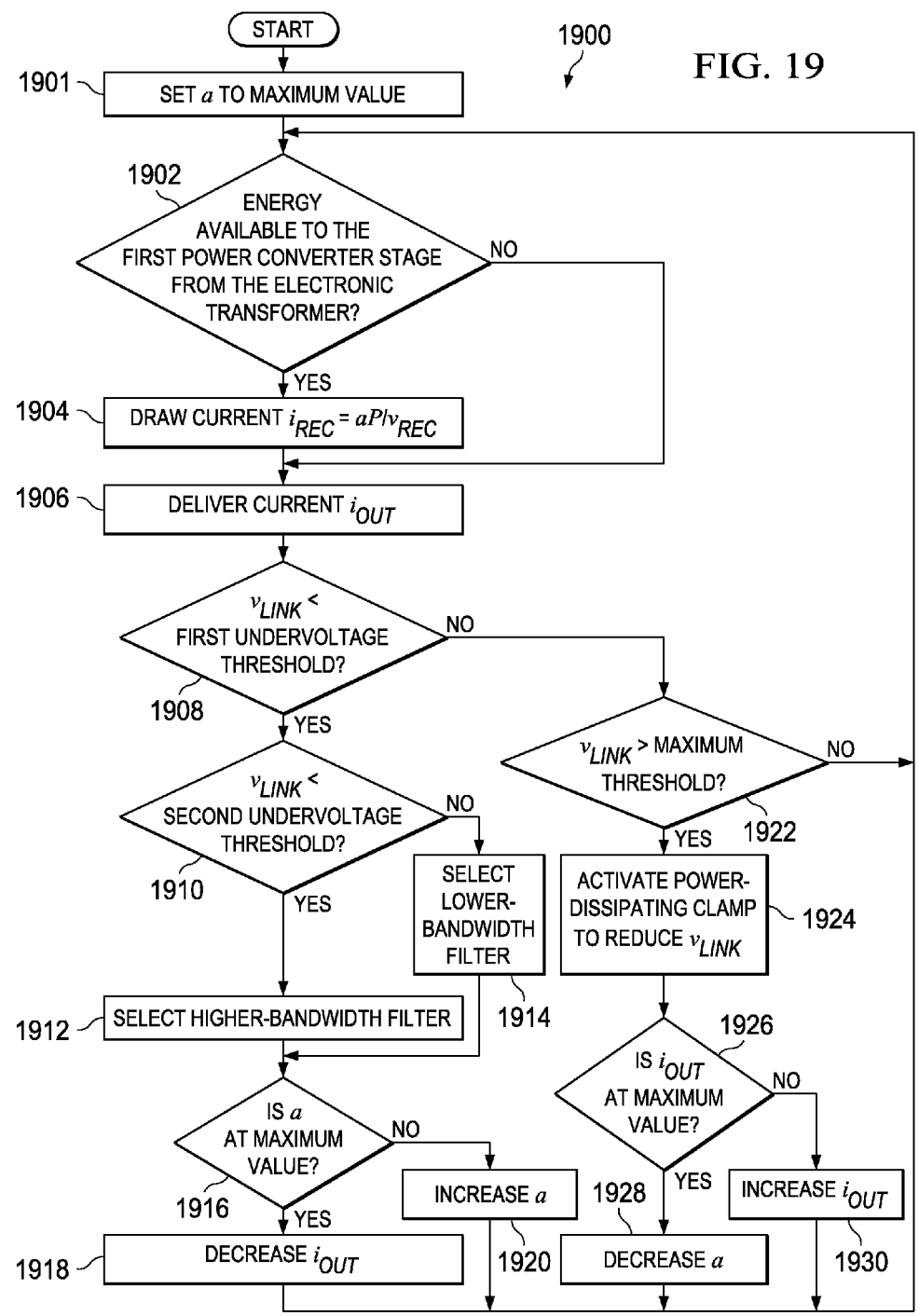
FIG. 19 illustrates a flow chart of an example method for ensuring compatibility between a lamp and an electronic transformer driver by a leading-edge dimmer, in accordance with embodiments of the present disclosure.

FIG. 19 illustrates a flow chart of an example method 1900 for ensuring compatibility between a lamp and an electronic transformer driven by a leading-edge dimmer, in accordance with embodiments of the present disclosure. According to some embodiments, method 1900 may begin at step 1901. As noted above, teachings of the present disclosure may be implemented in a variety of configurations of lighting system 1800. As such, the preferred initialization point for method 1900 and the order of the steps comprising method 1900 may depend on the implementation chosen.

At step 1901, controller 1112 may set variable a to its maximum value (e.g., 2).

At step 1902, controller 1112 may determine if energy is available to first power converter stage 1840 from electronic transformer 1820. If energy is available to first power converter stage 1840 from electronic transformer 1820, method 1900 may proceed to step 1904. Otherwise, method 1900 may proceed to step 1906.

At step 1904, responsive to a determination that energy is available to first power converter stage 1840 from electronic transformer 1820, controller 1112 may cause boost converter stage 1840 to draw current $i_{REC}$ in accordance with the equation $i_{REC}=aP/v_{REC}$, wherein a is a dimensionless variable multiplier having a value based on at least one of voltage $V_{REC}$ and an output power generated by buck converter stage 1850, and P is a rated power of LEDs 1880.

At step 1906, controller 1112 may cause buck converter stage 1850 to generate a current $L_{our}$. During the first execution of step 1906, controller 1112 may cause buck converter stage 1850 to generate a predetermined initial value of current $L_{our}$ (e.g., a percentage of the maximum current $i_{OUT}$ which may be generated by buck converter stage 1850). Afterwards, current $i_{OUT}$ may change as set forth elsewhere in the description of method 1900.

At step 1908, controller 1112 may determine if voltage $v_{LINK}$ is less than a first undervoltage threshold. If voltage $v_{LINK}$ is less than the first undervoltage threshold, method 1900 may proceed to step 1910. Otherwise, method 1900 may proceed to step 1922.

At step 1910, responsive to a determination that voltage $v_{LINK}$ is less than the first undervoltage threshold, controller 1112 may determine if voltage $v_{LINK}$ is less than a second undervoltage threshold lower than the first undervoltage threshold. If voltage $v_{LINK}$ is less than the second undervoltage threshold, method 1900 may proceed to step 1912. Otherwise, method 1900 may proceed to step 1914.

At step 1912, responsive to a determination that voltage $v_{LINK}$ is less than the second undervoltage threshold, controller 1112 may select a higher-bandwidth low-pass filter via which current $i_{OUT}$ may be decreased, as described in greater detail below.

At step 1914, responsive to a determination that voltage $v_{LINK}$ is more than the second undervoltage threshold, controller 1112 may select a lower-bandwidth low-pass filter in which current $i_{OUT}$ may be decreased, as described in greater detail below, wherein the lower-bandwidth low-pass filter has a bandwidth lesser than that of the higher-bandwidth low-pass filter.

At step 1916, controller 1112 may determine if variable a is at its maximum value (e.g., a=2). If variable a is at its maximum value, method 1900 may proceed to step 1918. Otherwise, method 1900 may proceed to step 1920.

At step 1918, in response to a determination that variable a is at its maximum value, controller 1112 may cause buck converter stage 1850 to decrease current $i_{OUT}$ delivered to LEDs 1880. Controller 1112 may implement a low-pass filter (e.g., selected in either of steps 1912 or 1914) in which it causes buck converter stage 1850 to decrease current $i_{OUT}$. After completion of step 1918, method 1900 may proceed again to step 1902.

At step 1920, in response to a determination that variable a is less than its maximum value, controller 1112 may increase the variable a. After completion of step 1920, method 1900 may proceed again to step 1902.

At step 1922, responsive to a determination that voltage $v_{LINK}$ is greater than the first undervoltage threshold, controller 1112 may determine if voltage $v_{LINK}$ is greater than a maximum threshold voltage. If voltage $v_{LINK}$ is greater than a maximum threshold voltage, method 1900 may proceed to step 1924. Otherwise, method 1900 may proceed again to step 1902.

At step 1924 responsive to a determination that voltage $v_{LINK}$ is greater than the maximum threshold voltage, controller 1112 may activate clamp 1870 in order to reduce voltage $v_{LINK}$.

At step 1926, controller 1112 may determine if current $i_{OUT}$ is at its maximum value (e.g., buck converter stage 1850 producing maximum power in accordance with the power rating of LEDs 1880). If current $i_{OUT}$ is at its maximum value, method 1900 may proceed to step 1928. Otherwise, method 1900 may proceed to step 1930.

At step 1928, in response to a determination that current $i_{OUT}$ is at its maximum value, controller 1112 may decrease the variable a. After completion of step 1918, method 1900 may proceed again to step 1902.

At step 1930, in response to a determination that current $i_{OUT}$ is less than its maximum value, controller 1112 may cause buck converter stage 1850 to increase current $i_{OUT}$. Controller 1112 may implement a low-pass filter in which it causes buck converter stage 1850 to increase $i_{OUT}$. After completion of step 1920, method 1900 may proceed again to step 1902.

Although FIG. 19 discloses a particular number of steps to be taken with respect to method 1900, method 1900 may be executed with greater or fewer steps than those depicted in FIG. 19. In addition, although FIG. 19 discloses a certain order of steps to be taken with respect to method 1900, the steps comprising method 1900 may be completed in any suitable order.

Method 1900 may be implemented using controller 1112 or any other system operable to implement method 1900. In certain embodiments, method 1900 may be implemented partially or fully in software and/or firmware embodied in computer-readable media.

Thus, in accordance with the methods and systems disclosed herein, controller 1112 causes lamp assembly 1890 to draw a first amount of power from the electronic transformer, the first amount of power comprising a maximum amount of a requested amount of power available from the electronic transformer, thus transferring energy from the electronic transformer to an energy storage device (e.g., link capacitor 1845) in accordance with the first amount of power, wherein the first amount of power equals the product of voltage $v_{REC}$ and the current $i_{REC}$. In addition, controller 1112 causes lamp assembly 1890 to transfer energy from the energy storage device (e.g., link capacitor 1845) to a load (e.g., LEDs 1880) at a rate (e.g., current $i_{OUT}$) such that a voltage (e.g., $v_{LINK}$) of the energy storage device is regulated within a predetermined voltage range (e.g., above the undervoltage thresholds and below the maximum threshold voltage). In addition, responsive to determining that the first amount of power is greater than a maximum amount of power deliverable to the load, controller 1112 may cause lamp assembly 1890 to decrease the requested amount of power (e.g., decrease a).

Although the foregoing discloses multiple algorithms for providing compatibility between a low-power lamp and dimmers and/or transformers coupled to the lamp, the availability of such algorithms may only be useful to the extent that a controller within a lamp assembly is capable of determining which algorithm is appropriate in order to provide compatibility between the lamp and the actual characteristics of the power infrastructure to which the lamp is coupled. While the transformer detection circuit described in FIGS. 12, 13A, and 13B may determine whether a lamp is coupled to a magnetic transformer or an electronic transformer, it may not be capable of determining a type of dimmer, if any, coupled to the transformer, and thus may not be able to accurately select an appropriate algorithm or compatibility mode of operation.

FIG. 20 illustrates a block diagram of example compatibility mode selection system and method 2000 for determining whether or not a then-active compatibility mode between a low-power lamp and a power infrastructure to which it is coupled is operating within predefined parameters, in accordance with embodiments of the present disclosure. A "then-active" mode is a compatibility mode in which a low-power lamp is operating at the time of execution of compatibility mode selection system and method 2000. Compatibility mode selection system and method 2000 may determine whether the then-active mode is operating within defined parameters (e.g., actually providing compatibility) and based thereon may generate an indication based on such determination.

The first part of determining whether a then-active compatibility mode provides compatibility between a lamp assembly and the power infrastructure to which it is coupled may be determining whether the then-active compatibility mode gives an indication of being a valid mode or invalid mode of operation, wherein such indication is output as a signal labeled "INVALID CONDITION" in FIG. 20. As shown in FIG. 20, system and method 2000 may monitor a compatibility mode specific error signal labeled as "ALGORITHM MODE ERROR" in FIG. 20. In some instances, such signal may be asserted if, during operation in a then-active compatibility mode, a controller of a lamp assembly (e.g., controller 1112) is unable to synchronize itself to an input signal to the lamp assembly (e.g., voltage signal $V_S$ present on the secondary winding of a transformer). In other instances, such signal may be asserted if, while in a then-active compatibility mode, a lamp assembly is unable to maintain the current or voltage waveforms described herein with respect to the particular then-active compatibility mode. Such may be the case when an electronic transformer coupled to the lamp assembly is unable to maintain oscillation in the then-active compatibility mode of operation, which may be indicated on an input signal to the lamp assembly (e.g., voltage signal $V_S$ present on the secondary winding of a transformer) by transformer restrike pulses occurring at regular intervals. When the ALGORITHM MODE ERROR signal is asserted, logic (e.g., OR gate 2002) of system 2000 may assert a signal INVALID CONDITION indicating that the then-active compatibility mode may be invalid.

In addition to the ALGORITHM MODE ERROR signal, whether the then-active compatibility mode generates a valid or invalid condition may be based on a measured half-line cycle of the input signal (e.g., transformer secondary winding voltage $V_S$) during operation in the then-active compatibility mode of operation, given as signal HLC in FIG. 20. Such half-line cycle may be determined in any suitable manner by a controller (e.g., controller 1112), such as, for example, determining an estimated half-line cycle by tracking zero crossings of an alternating current signal. A comparator 2008 may compare signal HLC to a predetermined maximum threshold half-line cycle and assert a signal HLC TOO LARGE if the half-line cycle exceeds the predetermined maximum threshold half-line cycle. Similarly, a comparator 2010 may compare signal HLC to a predetermined minimum threshold half-line cycle and assert a signal HLC TOO SMALL if the half-line cycle is less than the predetermined minimum threshold half-line cycle. Alternatively or in addition, a subtractor 2014 may compare a present half-line cycle with a previous half-line cycle (as delayed by delay block 2012) to determine a magnitude of a difference between the measured half-line cycle and the previously-measured half-line cycle. A comparator 2016 may in turn compare the difference to a predetermined maximum threshold difference and assert a signal HLC CHANGED TOO MUCH if the difference exceeds the predetermined maximum threshold difference. When one or more of signals HLC TOO LARGE, HLC TOO SMALL, and HLC CHANGED TOO MUCH are asserted, logic (e.g., OR gate 2002, OR gate 2004, AND gate 2006) of system 2000 may assert the signal INVALID CONDITION indicating that the then-active compatibility mode may be invalid.

Although direct current (DC) modes of operation are not explicitly disclosed herein, system and method 2000 may also support operation of a lamp with a DC source voltage. In such a case, system and method 2000 may sense that a voltage source has a constant voltage level (i.e., no zero crossings as would be seen with a full or half alternating current line cycle), and may select a proper operation mode to maximize performance. The systems and methods may remain in such DC mode by asserting a signal labeled as "LARGE HLC DISABLE" in FIG. 20 to block the signal HLC TOO LARGE from causing assertion of the signal INVALID CONDITION.

Thus, in accordance with the foregoing discussion, for a then-active compatibility mode:

a condition is invalid and the signal INVALID CONDITION is asserted if the current measured half-line cycle is greater than a predetermined maximum threshold, unless signal LARGE HLC DISABLE is detected;

a condition is invalid and the signal INVALID CONDITION is asserted if the current measured HLC half-line cycle is lesser than a predetermined minimum threshold;

a condition is invalid and the signal INVALID CONDITION is asserted if the magnitude of the difference between the current and a previous half-line cycle is greater than a predetermined maximum threshold;

a condition is invalid and the signal INVALID CONDITION is asserted if the signal ALGORITHM MODE ERROR is set high indicating a mode/transformer specific error condition;

otherwise, a condition is valid and the signal INVALID CONDITION is deasserted.

The second part of determining whether a then-active compatibility mode provides compatibility between a lamp assembly and the power infrastructure to which it is coupled may be "conditioning" the occurrences of invalid or valid conditions, as indicated by the signal INVALID CONDITION. Accordingly, system and method 2000 may comprise an invalid counter 2018 that increments when signal INVALID CONDITION is asserted and decrements when signal INVALID CONDITION is deasserted. Similarly, system and method 2000 may comprise a valid counter 2020 that increments when signal INVALID CONDITION is deasserted and decrements when signal INVALID CONDITION is asserted. In some embodiments, either of counter 2018 and 2020 may "saturate" at zero or some other number such that the particular counter does not decrement below such level of saturation. A comparator 2022 may compare the output of invalid counter 2018 to a predetermined maximum threshold value and assert a signal indicating that invalid counter 2018 has exceeded its predetermined maximum threshold value. Similarly, a comparator 2024 may compare the output of valid counter 2020 to a predetermined maximum threshold value and assert a signal indicating that valid counter 2024 has exceeded its predetermined maximum threshold value.

Based on the outputs of comparators 2022 and 2024, logic 2026 may determine if the compatibility of the then-current compatibility mode is valid (meaning the then-current mode provides compatibility between the lamp assembly and the power infrastructure to which it is coupled), invalid (meaning the then-current mode does not provide compatibility between the lamp assembly and the power infrastructure to which it is coupled), or unknown (meaning a determination has not been made regarding whether the then-current mode is valid or invalid). For example, logic 2026 may output a signal indicating the then-current compatibility mode is invalid if invalid counter 2018 has exceeded its predetermined maximum value, may output a signal indicating the then-current compatibility mode is valid if valid counter 2020 has exceeded its predetermined maximum value, and otherwise output a signal indicating the compatibility of the then-current mode is unknown. The determination of whether the compatibility of the then-current operating mode is valid or invalid may be used to select a compatibility mode of operation, as is described in greater detail below with respect to FIG. 21.

FIG. 21 illustrates a flow chart of an example method 2100 for selecting a compatibility mode of operation for providing compatibility between a low-power lamp and a power infrastructure to which it is coupled, in accordance with embodiments of the present disclosure. According to some embodiments, method 2100 may begin at step 2102. As noted above, teachings of the present disclosure may be implemented in a variety of configurations of lighting systems 1100 and/or 1800. As such, the preferred initialization point for method 2100 and the order of the steps comprising method 2100 may depend on the implementation chosen.

At step 2102, a controller (e.g., controller 1112) may cause a lamp assembly to operate in a first compatibility mode of operation (e.g., the mode of operation described in steps 1704 to 1708 of FIG. 17, the mode of operation described in steps 1710 to 1722 of FIG. 17, or the mode of operation described in FIG. 19).

At step 2104, the controller may determine (e.g., in accordance with system and method 2000) whether the compatibility of the first compatibility mode of operation is invalid. If invalid, method 2100 may proceed to step 2110, where the controller may determine whether a second compatibility mode of operation is valid or invalid. Otherwise, method 2100 may proceed to step 2106.

At step 2106, in response to determining that the compatibility of the first compatibility mode of operation is not invalid, the controller may determine (e.g., in accordance with system and method 2000) whether the compatibility of the first compatibility mode of operation is valid. If valid, method 2100 may proceed to step 2108. Otherwise, method 2100 may proceed again to step 2102, and steps 2102 to 2106 may repeat until the first compatibility mode of operation is determined to be either valid or invalid.

At step 2108, in response to determining that the compatibility of the first compatibility mode of operation is valid, the controller may reset a loop counter. The loop counter may be a value that indicates the number of times the controller has retried the various possible compatibility modes of operation for compatibility, and is described in greater detail below.

At step 2110, the controller may cause a lamp assembly to operate in a second compatibility mode of operation (e.g., the mode of operation described in steps 1704 to 1708 of FIG. 17, the mode of operation described in steps 1710 to 1722 of FIG. 17, or the mode of operation described in FIG. 19).

At step 2112, the controller may determine (e.g., in accordance with system and method 2000) whether the compatibility of the first compatibility mode of operation is invalid. If invalid, method 2100 may proceed to step 2118, where the controller may increment a loop counter. Otherwise, method 2100 may proceed to step 2114.

At step 2114, in response to determining that the compatibility of the second compatibility mode of operation is not invalid, the controller may determine (e.g., in accordance with system and method 2000) whether the compatibility of the second compatibility mode of operation is valid. If valid, method 2100 may proceed to step 2116. Otherwise, method 2100 may proceed again to step 2110, and steps 2110 to 2114 may repeat until the first compatibility mode of operation is determined to be either valid or invalid.

At step 2116, in response to determining that the compatibility of the second compatibility mode of operation is valid, the controller may reset the loop counter.

At step 2118, in response to determining that the second compatibility mode of operation is invalid, the controller may increment the loop counter, indicating that the controller has tested the compatibility of both of the first and second compatibility modes and determined both to be invalid.

At step 2120, the controller may determine whether the loop counter has reached a maximum value. If the loop counter has not reached its maximum value, method 2100 may proceed again to 2102, where the controller may again determine whether the first compatibility mode of operation or the second compatibility mode of operation is valid. If the loop counter has reached its maximum value, method 2100 may proceed to 2122.

At step 2122, in response to determining that the loop counter has reached its maximum value, controller 1112 may operate in accordance with a fail-safe algorithm or mode of operation. Thus, the controller may try to test each compatibility mode numerous times (e.g., equal to the maximum value of the loop counter) and if each of such numerous times, all compatibility modes are determined to be invalid, the controller will enter the fail-safe mode.

Although FIG. 21 discloses a particular number of steps to be taken with respect to method 2100, method 2100 may be executed with greater or fewer steps than those depicted in FIG. 21. In addition, although FIG. 21 discloses a certain order of steps to be taken with respect to method 2100, the steps comprising method 2100 may be completed in any suitable order. For example, while method 2100 describes an embodiment in which a controller tests up to two compatibility modes of operation for compatibility, in other embodiments a controller may test up to three or more compatibility modes of operation for compatibility.

System and method 2000 and/or method 2100 may be implemented using controller 1112 or any other system operable to implement system and method 2000 and/or method 2100. In certain embodiments, system and method 2000 and/or method 2100 may be implemented partially or fully in software and/or firmware embodied in computer-readable media.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
a controller for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly, and wherein the controller is configured to:
operate in a first compatibility mode of operation;
determine from an input signal of the lamp assembly during operation in the first compatibility mode of operation whether the first compatibility mode of operation provides compatibility between the lamp assembly and the power infrastructure;
select the first compatibility mode of operation from a plurality of modes of operation as a compatibility mode responsive to determining that the first compatibility mode of operation provides compatibility between the lamp assembly and the power infrastructure; and
select a second compatibility mode of operation from the plurality of modes of operation as the compatibility mode responsive to determining that the first compatibility mode of operation does not provide compatibility between the lamp assembly and the power infrastructure.

2. The apparatus of claim 1, wherein the controller is configured to determine whether the first compatibility mode of operation provides compatibility between the lamp assembly and the power infrastructure based on whether, during operation in the first compatibility mode of operation, the controller is able to synchronize itself to the input signal.

3. The apparatus of claim 1, wherein the controller is configured to determine whether the first compatibility mode of operation provides compatibility between the lamp assembly and the power infrastructure based on whether, during operation in the first compatibility mode of operation, the input signal indicates an inability of an electronic transformer integral to the power infrastructure to maintain oscillation in the first compatibility mode of operation.

4. The apparatus of claim 1, wherein the controller is configured to determine whether the first compatibility mode of operation provides compatibility between the lamp assembly and the power infrastructure based on a measured half-line cycle of the input signal during operation in the first compatibility mode of operation.

5. The apparatus of claim 4, wherein the controller is configured to determine that the first compatibility mode of operation provides compatibility between the lamp assembly and the power infrastructure responsive to the measured half-line cycle being less than a predetermined maximum threshold.

6. The apparatus of claim 4, wherein the controller is configured to determine that the first compatibility mode of operation provides compatibility between the lamp assembly and the power infrastructure responsive to the measured half-line cycle being more than a predetermined minimum threshold.

7. The apparatus of claim 4, wherein the controller is configured to determine that the first compatibility mode of operation provides compatibility between the lamp assembly and the power infrastructure responsive to a magnitude of a difference between the measured half-line cycle and a previously-measured half-line cycle being less than a predetermined maximum threshold.

8. The apparatus of claim 1, wherein the lamp assembly comprises a light-emitting diode lamp.

9. The apparatus of claim 1, wherein the lamp assembly comprises a multifaceted reflector form factor.

10. A method for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly, and the method comprising:
- operating the lamp assembly in a first compatibility mode of operation;
- determining from an input signal of the lamp assembly during operation in the first compatibility mode of operation whether the first compatibility mode of operation provides compatibility between the lamp assembly and the power infrastructure;
- selecting the first compatibility mode of operation from a plurality of modes of operation as a compatibility mode responsive to determining that the first compatibility mode of operation provides compatibility between the lamp assembly and the power infrastructure; and
- selecting a second compatibility mode of operation from the plurality of modes of operation as the compatibility mode responsive to determining that the first compatibility mode of operation does not provide compatibility between the lamp assembly and the power infrastructure.

11. The method of claim 10, wherein determining whether the first compatibility mode of operation provides compatibility between the lamp assembly and the power infrastructure comprises determining whether, during operation in the first compatibility mode of operation, the lamp assembly is able to synchronize itself to the input signal.

12. The method of claim 10, wherein determining whether the first compatibility mode of operation provides compatibility between the lamp assembly and the power infrastructure comprises determining whether the input signal indicates an inability of an electronic transformer integral to the power infrastructure to maintain oscillation in the first compatibility mode of operation.

13. The method of claim 10, wherein determining whether the first compatibility mode of operation provides compatibility between the lamp assembly and the power infrastructure comprises measuring a measured half-line cycle of the input signal during operation in the first compatibility mode of operation.

14. The method of claim 13, further comprising determining that the first compatibility mode of operation provides compatibility between the lamp assembly and the power infrastructure responsive to the measured half-line cycle being less than a predetermined maximum threshold.

15. The method of claim 13, further comprising determining that the first compatibility mode of operation provides compatibility between the lamp assembly and the power infrastructure responsive to the measured half-line cycle being more than a predetermined minimum threshold.

16. The method of claim 13, further comprising determining that the first compatibility mode of operation provides compatibility between the lamp assembly and the power infrastructure responsive to a magnitude of a difference between the measured half-line cycle and a previously-measured half-line cycle being less than a predetermined maximum threshold.

17. The method of claim 10, wherein the lamp assembly comprises a light-emitting diode lamp.

18. The method of claim 10, wherein the lamp assembly comprises a multifaceted reflector form factor.

19. An apparatus comprising:
- a controller for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly, and wherein the controller is configured to:
  - sequentially operate the lamp assembly in at least a first compatibility mode of operation and a second compatibility mode of operation;
  - determine whether either of the first compatibility mode of operation or the second compatibility mode of operation provides compatibility between the lamp assembly and the power infrastructure; and
  - select a compatibility mode of operation based on whether either of the first compatibility mode of operation or the second compatibility mode of operation provides compatibility between the lamp assembly and the power infrastructure.

20. A method for selecting a compatibility mode of a lamp assembly, wherein the compatibility mode provides compatibility between the lamp assembly and a power infrastructure to which it is coupled, and the power infrastructure includes at least one of a type of dimmer and a type of transformer and coupled to the lamp assembly, and the method comprises:
- sequentially operating the lamp assembly in at least a first compatibility mode of operation and a second compatibility mode of operation;
- determining whether either of the first compatibility mode of operation or the second compatibility mode of operation provides compatibility between the lamp assembly and the power infrastructure; and
- selecting a compatibility mode of operation based on whether either of the first compatibility mode of operation or the second compatibility mode of operation provides compatibility between the lamp assembly and the power infrastructure.

* * * * *